United States Patent
Im et al.

(10) Patent No.: US 9,268,500 B2
(45) Date of Patent: Feb. 23, 2016

(54) HOST DEVICE AND SYSTEM INCLUDING THE SAME

(71) Applicant: Samsung Electronics Co., Ltd., Suwon-Si, Gyeonggi-Do (KR)

(72) Inventors: Jeon-teak Im, Anseong-si (KR); Tae-gyun Kim, Seoul (KR); Jae-young Choi, Hwaseong-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 136 days.

(21) Appl. No.: 13/975,895

(22) Filed: Aug. 26, 2013

(65) Prior Publication Data

US 2014/0059276 A1 Feb. 27, 2014

(30) Foreign Application Priority Data

Aug. 27, 2012 (KR) .................. 10-2012-0093881

(51) Int. Cl.
*G06F 3/06* (2006.01)
*G06F 12/00* (2006.01)
*G06F 13/38* (2006.01)
*G06F 13/16* (2006.01)

(52) U.S. Cl.
CPC .............. *G06F 3/0688* (2013.01); *G06F 3/061* (2013.01); *G06F 3/0629* (2013.01); *G06F 12/00* (2013.01); *G06F 13/385* (2013.01); *G06F 3/0656* (2013.01); *G06F 3/0668* (2013.01); *G06F 13/16* (2013.01); *G06F 13/1668* (2013.01); *G06F 13/1673* (2013.01)

(58) Field of Classification Search
CPC ... G06F 3/0668; G06F 13/16; G06F 13/1668; G06F 13/1673
See application file for complete search history.

(56) References Cited

U.S. PATENT DOCUMENTS

| | | | |
|---|---|---|---|
| 5,657,281 A * | 8/1997 | Rao ............................. | 365/200 |
| 6,731,540 B2 | 5/2004 | Lee et al. | |
| 7,590,782 B2 | 9/2009 | Cedar et al. | |
| 7,752,380 B2 | 7/2010 | Avraham et al. | |
| 2003/0103392 A1 | 6/2003 | Matsushita et al. | |
| 2008/0165795 A1* | 7/2008 | Baruch ......................... | 370/421 |
| 2010/0036999 A1 | 2/2010 | Zhuang et al. | |

(Continued)

FOREIGN PATENT DOCUMENTS

| JP | 2001265580 A | 9/2001 |
|---|---|---|
| KR | 0909965 A | 11/2008 |

(Continued)

OTHER PUBLICATIONS

Office Action issued in U.S. Appl. No. 14/011,162 dated Apr. 14, 2015.

*Primary Examiner* — Kris Rhu
(74) *Attorney, Agent, or Firm* — Harness, Dickey & Pierce, P.L.C.

(57) ABSTRACT

A memory module includes a first storage module including a first module controller and a first memory unit. The first storage module is configured to receive first partial data from a host and write the first partial data to the first memory unit. A second storage module includes a second module controller and a second memory unit. The second storage module is configured to receive second partial data from the host and write the second partial data to the second memory unit. The first storage module and the second storage module are configured to connect to the host through a single host interface bus.

6 Claims, 16 Drawing Sheets

(56) References Cited

U.S. PATENT DOCUMENTS

| | | |
|---|---|---|
| 2010/0061134 A1 | 3/2010 | Jeddeloh |
| 2010/0161886 A1 | 6/2010 | Toelkes et al. |
| 2010/0262758 A1 | 10/2010 | Swing et al. |
| 2010/0262759 A1 | 10/2010 | Borchers et al. |
| 2011/0010491 A1 | 1/2011 | Anderson |
| 2011/0102997 A1 | 5/2011 | Schuette |
| 2011/0202818 A1 | 8/2011 | Yoon et al. |
| 2011/0258373 A1 | 10/2011 | Miura et al. |
| 2011/0283043 A1 | 11/2011 | Schuette |
| 2011/0302361 A1 | 12/2011 | Yamazaki et al. |
| 2013/0094301 A1 | 4/2013 | Min |
| 2013/0166865 A1* | 6/2013 | Lemberg et al. ............... 711/162 |

FOREIGN PATENT DOCUMENTS

| | | |
|---|---|---|
| KR | 20090071337 A | 7/2009 |
| KR | 20100035327 A | 4/2010 |
| KR | 20110015269 A | 2/2011 |

* cited by examiner

HOST DEVICE AND SYSTEM INCLUDING THE SAME

CROSS-REFERENCE TO RELATED APPLICATIONS

This application claims the benefit of priority under 35 U.S.C. §119 to Korean Patent Application No. 10-2012-0093881, filed on Aug. 27, 2012, in the Korean Intellectual Property Office, the disclosure of which is incorporated herein in its entirety by reference.

BACKGROUND

Example embodiments relate to a host device, and more particularly, to a host device using a shared bus and a system including the host device.

Recently, as use of a large amount of contents, e.g., a moving picture, has become widespread, there is a growing need to increase the capacities of storage devices. Also, advancement in wired/wireless communication technology and cloud computing technology has triggered a need to increase the operating speeds of storage devices. As described above, much attention has been paid to importance of an increase in the capacities and operating speeds of storage devices capable of performing a write/read operation through a data communication with a host device.

SUMMARY

Example embodiments provide a host device for increasing the capacity and operating speed of a storage device and a system including the host device.

According to an example embodiment of the inventive concepts, a memory module includes a first storage module including a first module controller and a first memory unit, the first storage module being configured to receive first partial data from a host and write the first partial data to the first memory unit; and a second storage module including a second module controller and a second memory unit, the second storage module being configured to receive second partial data from the host and write the second partial data to the second memory unit, wherein the first storage module and the second storage module are configured to connect to the host through a single host interface bus.

The memory module may be configured such that the first partial data and the second partial data are written in the first memory unit and the second memory unit respectively in parallel.

The memory module may be configured such that the first partial data is written in the first memory unit in parallel with receiving the second partial data from the host.

The first storage module may further include a first memory buffer and the second storage module may further include a second memory buffer; wherein the memory module is configured such that while the first partial data is written to the first memory unit, the first module controller receives third partial data from the host; and wherein the memory module is configured such that while the second partial data is written to the second memory unit, the second module controller receives fourth partial data from the host.

The first memory buffer and the second memory buffer may include volatile memory.

The first module controller may be configured to write the third partial data to the first memory unit after the first partial data is written to the first memory unit; and the second module controller may be configured to write the fourth partial data to the second memory unit after the second partial data is written to the second memory unit.

The first storage module may be configured to transmit a first preparation signal to the host when writing the third partial data to the first memory unit is completed.

The first storage module may be configured to be activated in response to a first selection signal transmitted from the host, and the second storage module may be configured to be activated in response to a second selection signal transmitted from the host.

The first partial data may include a plurality of first data fragments, and the first memory unit may include of a plurality of first storage units; and the first module controller may be configured to write the plurality of the first data fragments to the first storage units, respectively.

Each of the first storage units may correspond to a plane which is a page-storing unit of a non-volatile memory device.

According to an embodiment of the inventive concepts, a memory system includes a first storage module; a second storage module; a first connector configured to connect to the first storage module; a second connector configured to connect to the second storage module; and a host controller configured to connect to the first connector and the second connector through a single host interface bus, wherein the host controller is configured to transmit chunk data to the first storage module and the second storage module through the signal host interface bus.

The first connector and the second connector may be slots.

The first storage module may include a first module controller configured to receive first partial data of the chunk data; and a first memory unit configured to receive the first partial data from the first module controller, wherein the second storage module includes, a second module controller configured to receive second partial data of the chunk data; and a second memory unit configured to receive the second partial data from the second module controller, and wherein the memory module is configured such that the first partial data and the second partial data are written in the first memory unit and the second memory unit respectively in parallel.

The first storage module may further include a first memory buffer and the second storage module may further include a second memory buffer, wherein the memory module is configured such that while the first partial data is written to the first memory unit, the first module controller receives third partial data from the host controller; and wherein the memory module is configured such that while the second partial data is written to the second memory unit, the second module controller receives fourth partial data from the host controller.

The first memory buffer and the second memory buffer may include volatile memory.

The first module controller may be configured to write the third partial data to the first memory unit after the first partial data is written to the first memory unit; and the second module controller may be configured to write the fourth partial data to the second memory unit after the second partial data is written to the second memory unit.

The first storage module and the second storage module may be solid state storage modules.

The first memory unit may include a plurality of memory chips; and the first storage module may further include a first crossbar switch configured to receive a control signal from the first memory module controller and transmit a chip select signal to the first memory unit.

The first memory unit may include a first memory package and a second memory package; wherein the first memory package includes a plurality of memory chips and the second memory package includes a plurality of memory chips; and wherein the first storage module further includes a first crossbar switch configured to connect to the first memory package through a first array channel and connect to the second memory package through a second array channel, the first crossbar switch configured to connect to the first module controller.

According to an example embodiment of the inventive concepts, a memory system includes a plurality of separate solid state storage modules including at least a first solid state module and a second solid state module; a host controller; and a host interface bus, the host interface bus configured to connect the host controller to each of the plurality of solid state storage modules, the host controller being configured to control a data writing operation of the plurality of solid state storage modules such that the host controller sends first data to the first solid state storage module via the host interface bus, and the host controller sends second data to the second solid state storage module via the host interface bus such that the second data is received at the second solid state storage module while the first solid state storage module is writing the first data.

The memory system may further include a first connector configured to connect to the first solid state storage module; and a second connector configured to connect to the second solid state storage module, wherein the host interface bus is configured to connect to the first solid state storage module and the second solid state storage module via the first connector and the second connector, respectively.

The host controller may be configured to control the host interface bus to divide write chunk data into the first and second data before sending the first and second data, respectively, to the first solid state storage module via the first connector and the second solid state storage module via the second connector.

According to an example embodiment of the inventive concepts, a memory module includes a module controller; a crossbar switch connected to the module controller via a controller channel; and a memory unit including a plurality of memory chips, the memory unit being connected to the crossbar switch via an array channel, wherein the module controller is configured to communicate with the memory unit via the controller channel and the array channel.

The plurality of memory chips may be a plurality of nonvolatile memory chips; and the module controller may be a nonvolatile module controller.

The memory module may be a solid state storage module.

The plurality of memory chips may be embodied as one or more 3D flash memory elements in which a plurality of memory cells are vertically stacked.

The crossbar switch may be configured to transmit chip select signals to the memory unit via the array channel such that the module controller accesses the memory unit.

The memory unit may be configured to indicate a status of the memory unit to the module controller by transmitting status signals indicating a write/read operation in the memory unit.

The plurality of memory chips may be configured to share data input signals transmitted from the crossbar switch; and the plurality of memory chips may be configured such that the plurality of memory chips do not share the chip select signals.

The module controller may be configured to transmit a crossbar switch selection signal to the crossbar switch via the controller channel such that the module controller controls the crossbar switch.

According to an example embodiment, a memory module includes a module controller; a crossbar switch connected to the module controller via a controller channel; and a memory unit including a first memory package and a second memory package, the first memory package is connected to the crossbar switch via a first array channel and the second memory package is connected to the crossbar switch via a second array channel, wherein the module controller is configured to communicate with the memory unit via the controller channel, the first array channel, and the second array channel.

The first memory package and the second memory package may include a plurality of nonvolatile memory chips respectively; and the module controller may be a nonvolatile module controller.

The memory module may be a solid state storage module.

The first memory package and the second memory package may be embodied as one or more 3D flash memory elements in which plurality of memory cells are vertically stacked.

The crossbar switch may be configured to transmit first chip selection signals to the first memory package and transmit second chip selection signals to the second memory package; and the module controller may be configured to access to the first memory package and the second memory package based on the first chip selection signals and the second chip selection signals.

The first memory package and the second memory package may be configured to indicate, to the module controller, statuses of the first memory package and the second memory package by respectively transmitting first status signals and second status signals indicating write/read operations in the memory unit.

According to at least one example embodiment, a memory module may include a module controller; a first crossbar switch connected to the module controller via a first controller channel; a second crossbar switch connected to the module controller via a second controller channel; a first group of memory chips connected to the first crossbar switch via at least one first array channel; and a second group of memory chips connected to the second crossbar switch via at least one second array channel, wherein the module controller is configured to communicate with the first group of memory chips and the second group of memory chips via the first controller channel, the second controller channel, the at least one first array channel and the at least one second array channel.

The first group of memory chips and the second group of memory chips may include a plurality of nonvolatile memory chips; and the module controller may be a nonvolatile module controller.

The memory module may be a solid state storage module.

The first group of memory chips and the second group of memory chips may be embodied as one or more 3D flash memory elements in which plurality of memory cells are vertically stacked.

The module controller may be configured to transmit a first crossbar switch selection signal to the first crossbar switch via the first controller channel and transmit a second crossbar switch selection signal to the second crossbar switch via the second controller channel; and the module controller may be configured to control the first crossbar switch and the second crossbar switch based on the first crossbar switch selection signal and the second crossbar switch selection signal respectively.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF THE EMBODIMENTS

Figure 1:
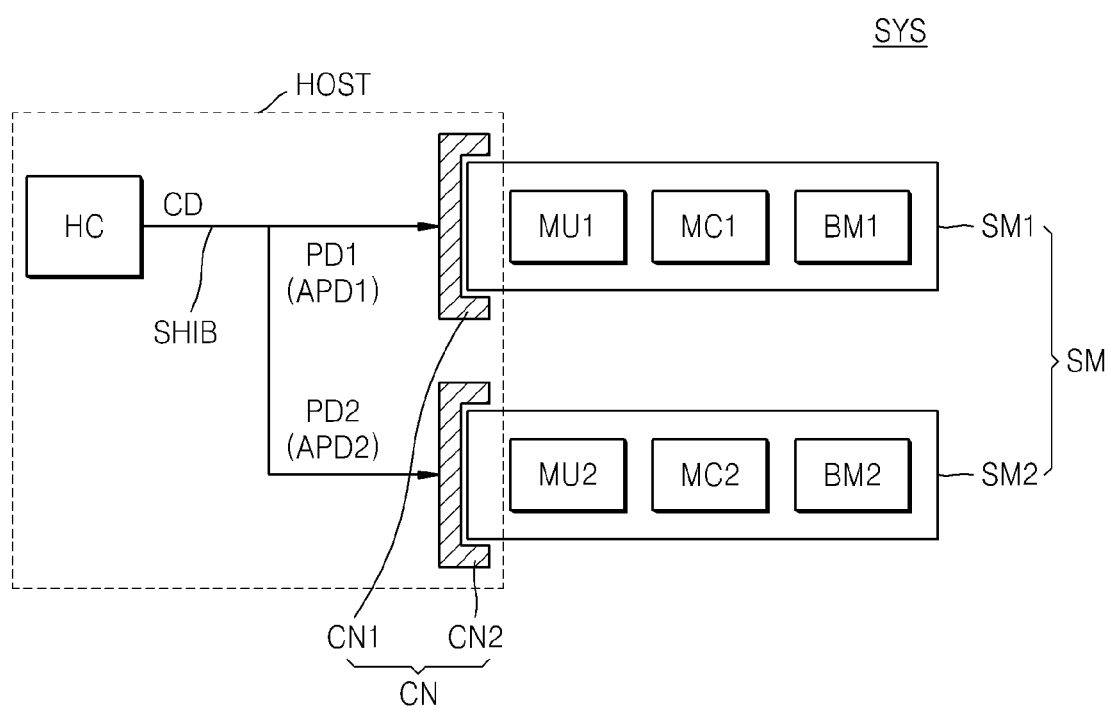
FIG. 1 is a schematic block diagram of a host device and a system including the same, according to at least one example embodiment.

Hereinafter, example embodiments will be described in detail with reference to the appended drawings.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a schematic block diagram of a host device HOST and a system SYS including the same, according to at least one example embodiment.

Referring to FIG. 1, the host device HOST may include a host controller HC, a single host interface bus SHIB, and a plurality of connectors CN. The system SYS includes the host device HOST and a plurality of storage modules SM, and may be configured to establish data communication between the host device HOST and the plurality of storage modules SM via the single host interface bus SHIB.

The host controller HC may include an operation device configured to control the host device HOST. For example, the operation device may include a central processing unit (CPU) including a core and a cache memory, and a digital signal processor (DSP). The host controller HC may be configured to control the single host interface bus SHIB such that chunk data CD may be divided and written to the plurality of storage modules SM.

The single host interface bus SHIB may be disposed between the plurality of connectors CN and the host controller HC. The plurality of connectors CN may share the single host interface bus SHIB. For example, the plurality of connectors CN may be connected to the host controller HC via the shared single host interface bus SHIB. For example, the plurality of connectors CN may be a plurality of slots for mounting the storage modules SM, but example embodiments are not limited thereto and the plurality of connectors CN may function as places to which the storage modules SM may be connected.

To connect the plurality of storage modules SM, e.g., a first storage module SM1 and a second storage module SM2, the plurality of connectors CN, e.g., a first connector CN1 and a second connector CN2, may be provided. The host controller HC may be configured to control the single host interface bus SHIB such that the chunk data CD may be divided and written to the plurality of storage modules SM connected to the plurality of connectors CN. To this end, the host controller HC may divide the chunk data CD into pieces of partial data and write the pieces of the partial data to the plurality of storage modules SM, respectively.

For example, the host controller HC may control the single host interface bus SHIB to divide and write the chunk data CD including first partial data PD1 and second partial data PD2 to the first storage module SM1 connected to the first connector CN1 and the second storage module SM2 connected to the second connector CN2.

In this case, during the writing of the chunk data CD, the host controller HC may control the single host interface bus SHIB such that the first partial data PD1 may first be written to the first storage module SM1 and the second partial data PD2 may then be written to the second storage module SM2. Thus, the first partial data PD1 may be delivered to the first storage module SM1 and the second partial data PD2 may be delivered to the second storage module SM2, via the single host interface bus SHIB.

The first storage module SM1 may include a first module controller MC1, a first memory unit MU1, and a first buffer memory BM1. The first module controller MC1 may be connected to the single host interface bus SHIB and may be configured to receive the first partial data PD1 of the chunk data CD. The first memory unit MU1 may be connected to the first module controller MC1 and may be configured to store the first partial data PD1. The first module controller MC1 may be configured to write the first partial data PD1 to the first memory unit MU1 or to read the first partial data PD1 from the first memory unit MU1.

The second storage module SM2 may include a second module controller MC2, a second memory unit MU2, and a second buffer memory BM2. Operations of these elements of the second storage module SM2 may be the same as or similar to those of the first module controller MC1, the first memory unit MU1, and the first buffer memory BM1 of the first storage module SM1, respectively.

The first partial data PD1 delivered to the first storage module SM1 may be stored in the first memory unit MU1 by the first module controller MC1. Simultaneously, the second partial data PD2 delivered to the second storage module SM2 may be stored in the second memory unit MU2 by the second module controller MC2. That is, the second partial data PD2 may be stored in the second storage module SM2 in parallel with the writing of the first partial data PD1 to the first storage module SM1.

For example, when the host device HOST desires to write the chunk data CD to the first storage module SM1 and the second storage module SM2, the host controller HC may transmit the first partial data PD1 to the first storage module SM1 and then transmit the second partial data PD2 to the second storage module SM2.

After the transmission of the first partial data PD1 to the first storage module SM1 is completed, the first module controller MC1 may perform a first write operation to store the first partial data PD1 in the first storage module SM1. Meanwhile, the host controller HC may transmit the second partial data PD2 to the second storage module SM2. After the transmission of the second partial data PD2 to the second storage module SM2 is completed, the second module controller MC2 may perform a second write operation to store the second partial data PD2 in the second storage module SM2.

The transmission of the second partial data PD2 to the second storage module SM2 may be completed before the first write operation is completed. This is because the second partial data PD2 may be fast transmitted to the second storage module SM2 via the single host interface bus SHIB employing a serial data communication method. For example, a time period that the host controller HC needs to transmit partial data of 64 KB to a storage module via the single host interface bus SHIB may be thirty times less than a time period that the storage module needs to store the partial data of 64 KB to a memory unit.

As described above, since a data transmission speed of the host controller HC is very high, the second write operation (storing the second partial data PD2 in the second storage module SM2 by the second module controller MC2) may begin before the first write operation (storing the first partial data PD1 in the first storage module SM1 by the first module controller MC1) is completed. Thus, the first write operation and the second write operation may be performed in parallel. As the first write operation and the second write operation are performed in parallel, the chuck data CD may thus be rapidly written.

The first buffer memory BM1 of the first storage module SM1 and the second buffer memory BM2 of the second storage module SM2 may be configured to store first additional partial data APD1 and second additional partial data APD2, respectively. For example, while the first write operation is performed to write the first partial data PD1 to the first memory unit MU1, the first module controller MC1 may receive the additional partial data APD1 from the host device HOST and store the first additional partial data APD1 in the first buffer memory BM1. After the first write operation is completed, the first module controller MC1 may read the first additional partial data APD1 from the first buffer memory BM1 and write the first additional partial data APD1 to the first memory unit MU1. An operation of the second module controller MC2 may be similar to that of the first module controller MC1 as described above.

More specifically, if the chunk data CD includes the first partial data PD1, the second partial data PD2, the first additional partial data APD1, and the second additional partial data APD2, then the host controller HC may first transmit the first partial data PD1 to the first storage module SM1 and may then transmit the second partial data PD2 to the second storage module SM2. Then, as described above, the first write operation of storing the first partial data PD1 in the first memory unit MU1 and the second write operation of storing the second partial data PD2 in the second memory unit MU2 may be performed in parallel.

After the host controller HC transmits the second partial data PD2 to the second storage module SM2, the host controller HC may transmit the first additional partial data APD1 to the first storage module SM1. In this case, since the first write operation of writing the first partial data PD1 to the first memory unit MU1 is not completed, the first additional partial data APD1 cannot be written to the first memory unit MU1. During the first write operation, the first module controller MC1 may store the first additional partial data APD1 in the first buffer memory BM1. After the first write operation is completed, the first module controller MC1 may read the first additional partial data APD1 from the first buffer memory BM1 and write the first additional partial data APD1 to the first memory unit MU1.

After the transmission of the first additional partial data APD1 to the first storage module SM1 is completed, the host controller HC may transmit the second additional partial data APD2 to the second storage module SM2. Since the second write operation of writing the second partial data PD2 to the second memory unit MU2 is not completed, the second additional partial data APD2 cannot be written to the second memory unit MU2. During the second write operation, the second module controller MC2 may store the second additional partial data APD2 in the second buffer memory BM2. After the second write operation is completed, the second module controller MC2 may read the second additional partial data APD2 from the second buffer memory BM2 and write the second additional partial data APD2 to the second memory unit MU2.

The capacity of the first buffer memory BM1 may correspond to the amount of additional partial data received during the first write operation. For example, if the first storage module SM1 is a solid state storage (SSS) module and the first memory unit MU1 is a flash memory, then block erasing and programming operations should be performed to perform the first write operation. It may take 3 ms to perform the block erasing and programming operations. If the amount of additional partial data that is or may be received for 3 ms is about 60 MB, then the capacity of the first buffer memory BM1 may be set to 64 MB. If it takes 6 ms to perform the first write operation, then the capacity of the first buffer memory BM1 may be set to 128 MB.

If it is desired for the host controller HC to continuously write data to the SSS module while the SSS module writes data to the flash memory, then the module controller MC1 may receive the data from the host controller HC and temporarily write the data to the buffer memory BM1, such as a dynamic random access memory (DRAM). The capacity of the buffer memory BM1 may be set to correspond to a time period required to write data to the flash memory of the module controller MC1. Accordingly, the capacity of the buffer memory BM1 may be minimized, or, alternatively, lowered to reduce costs while maximizing, or, alternatively, raising the performance thereof.

By providing the buffer memory BM1, the host controller HC may sequentially write additional partial data to SSS modules that are prepared. Thus, writing to a flash memory in an SSS module and writing to a buffer memory in an SSS module of the host controller HC may be simultaneously performed.

Figure 2:
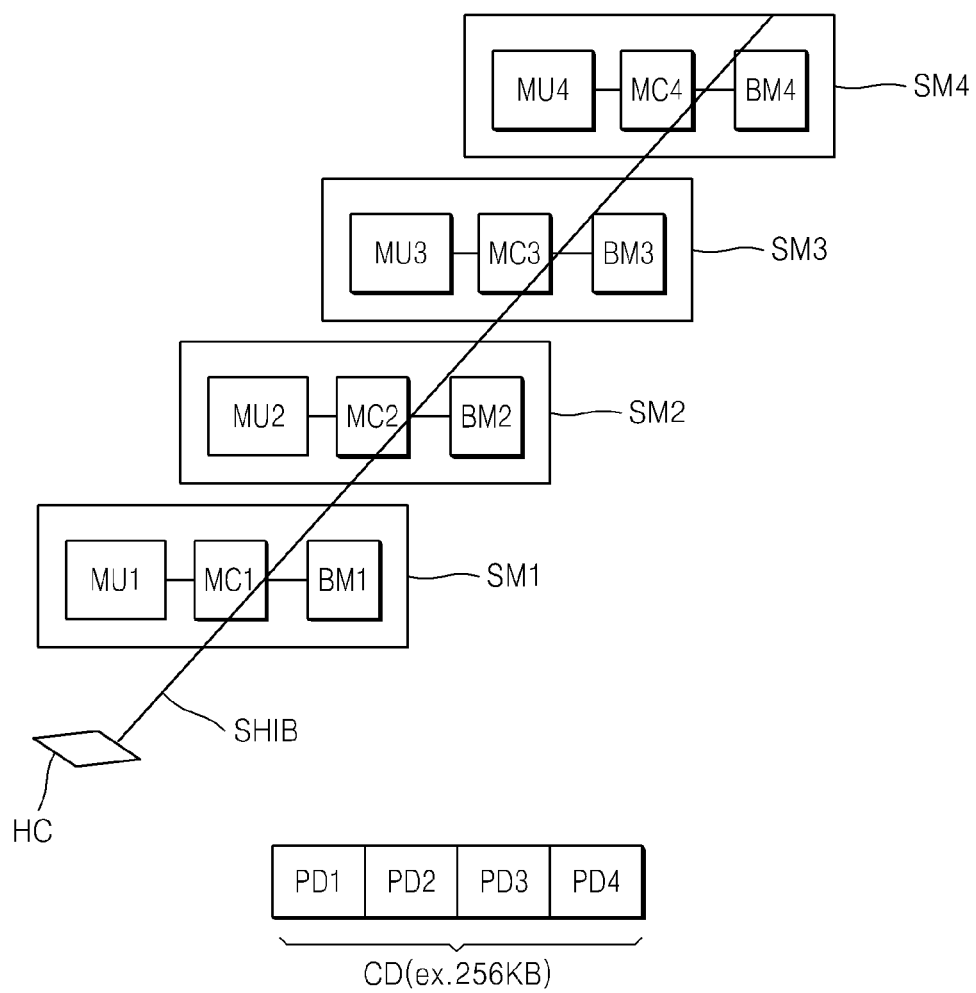
FIG. 2 is a schematic block diagram of a host device and a system including the same, according to at least one example embodiment.

FIG. 2 is a schematic block diagram of a host device HOST and a system including the same, according to at least one example embodiment.

Referring to FIG. 2, a first storage module SM1 to a fourth storage module SM4 are SSS modules that may be connected to the host controller HC by sharing a single host interface bus SHIB. Each of the SSS modules may include a memory unit, a buffer memory, and a module controller connected between the memory unit and the buffer memory.

The host controller HC may perform a write operation on each of the SSS modules as described below. In this case, a memory unit structure of each of the SSS modules may be determined based on the following write operation.

<A Write Operation Performed on Each of the SSS Modules by the Host Controller HC and a Memory Unit Structure of Each of the SSS Modules>

Referring to FIG. 2, the host controller HC may be configured to sequentially write an amount of data corresponding to storing units of partial data, e.g., 64 KB data, to each of prepared SSS modules. In this case, the number of planes on a memory unit connected to a module controller may be equal to or greater than the number of pages included in the storing units. For example, if a storing unit of first partial data PD1 is 64 KB and each page is 4 KB, then the number of pages included in the storing units may be sixteen. In this case, a first memory unit MU1 may include sixteen or more planes.

Here, the term 'plane' may be defined as a page-storing unit that means a physical space of a memory device, e.g., a flash memory array, to which pages are written. The plane and a structure of a memory unit will be described in detail with reference to FIGS. 3 and 4 below.

According to at least one example embodiment, the host controller HC may divide chunk data CD of 256 KB into first partial data PD1 to fourth partial data PD4, each of which is 64 KB, and may transmit the first to fourth partial data PD1 to PD4 to the first to fourth storage modules SM1 to SM4, respectively. For example, if writing is prepared to be performed in an order of the first storage module SM1, the fourth storage module SM4, the second storage module SM2, and the third storage module SM3, then the first to fourth partial data PD1 to PD4, each of which is 64K may be stored in this order. In this case, the partial data stored in the first to fourth storage modules SM1 to SM4 is as shown in Table 1.

TABLE 1

| First Storage Module SM1 | Second Storage Module SM2 | Third Storage Module SM3 | Fourth Storage Module SM4 |
| --- | --- | --- | --- |
| First Partial Data PD1 | Third Partial Data PD3 | Fourth Partial Data PD4 | Second Partial Data PD2 |

According to at least one example embodiment, if writing is prepared to be performed in an order of the first storage module SM1, the second storage module SM2, the third storage module SM3, and the fourth storage module SM4, then the first to fourth partial data PD1 to PD4, each of which is 64 KB may be stored in this order. In this case, the partial data stored in the first to fourth storage modules SM1 to SM4 is as shown in Table 2.

TABLE 2

| First Storage Module SM1 | Second Storage Module SM2 | Third Storage Module SM3 | Fourth Storage Module SM4 |
| --- | --- | --- | --- |
| First Partial Data PD1 | Second Partial Data PD2 | Third Partial Data PD3 | Fourth Partial Data PD4 |

Referring to Table 2, first to fourth module controllers MC1 to MC4 may write the first to fourth partial data PD1 to PD4 to first to fourth memory units MU1 to MU4, respectively.

For example, if the first storage module SM1 is a flash module including a flash memory device and a page of the flash memory device is 4 KB, then the first module controller MC1 may generate sixteen data fragments by dividing the first partial data PD1 of 64 KB in page-storing units, each of which is 4 KB, and may simultaneously write the sixteen data fragments to sixteen planes. In other words, the sixteen data fragments are sub partial data divided from the first partial data PD1, e.g., page data.

In this case, the first memory unit MU1 may be configured to include sixteen or more planes. That is, according to at least one example embodiment, a plane structure of a memory module may be determined based on a data transmission method of the single host interface bus SHIB. As another example, if chunk data is 1024 KB and is divided into eight pieces of partial data, each of which is 128 KB and a page of a flash memory device is 4 KB, then the first module controller MC1 may be configured to simultaneously write data fragments that constitute partial data to thirty two planes. Also, the first memory unit MU1 may include thirty two planes.

Figure 3:
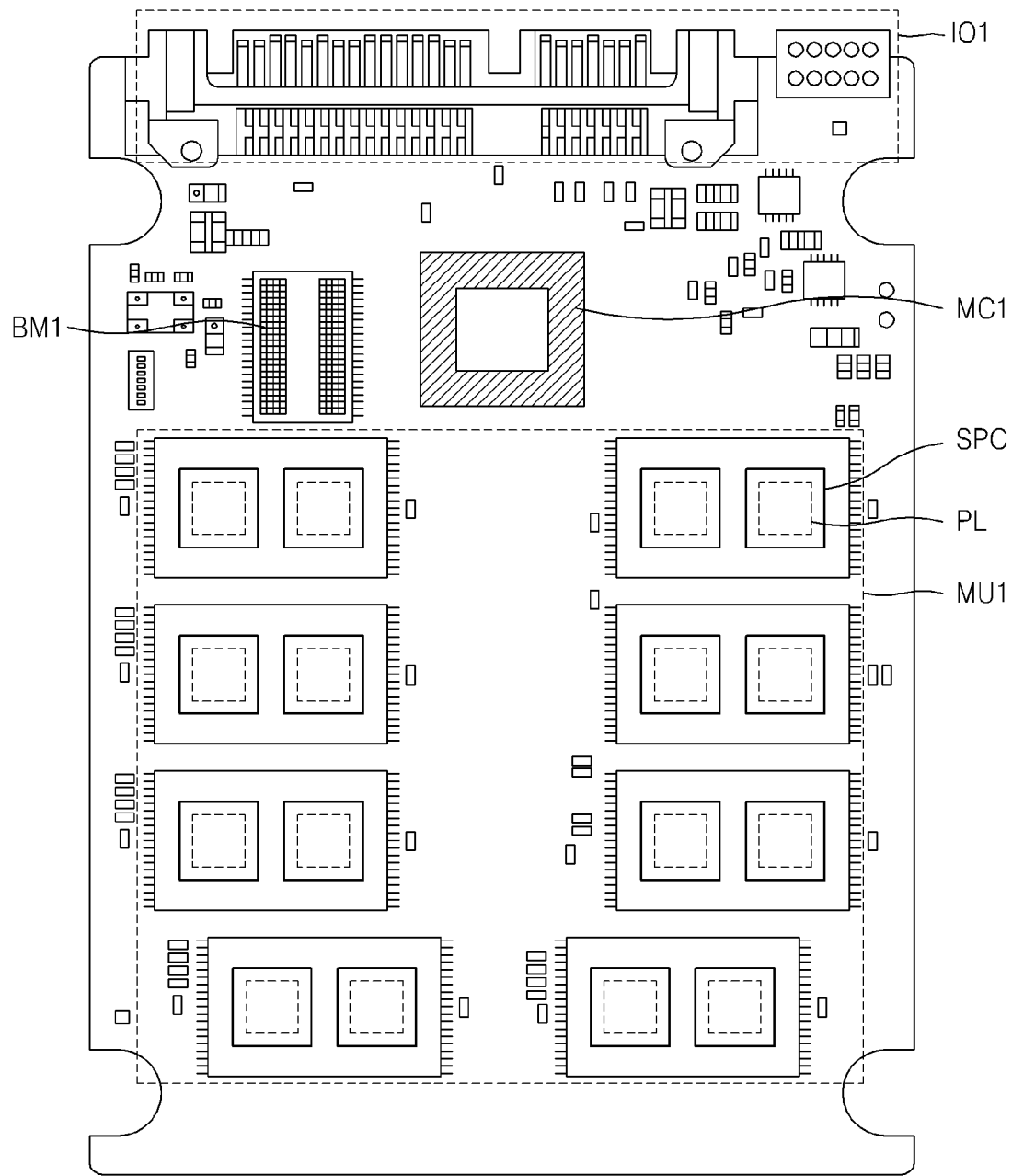
FIGS. 3 and 4 are schematic plane views of a solid state storage (SSS) module that is an example of a storage module illustrated in FIG. 2, according to at least one example embodiment.
Figure 4:
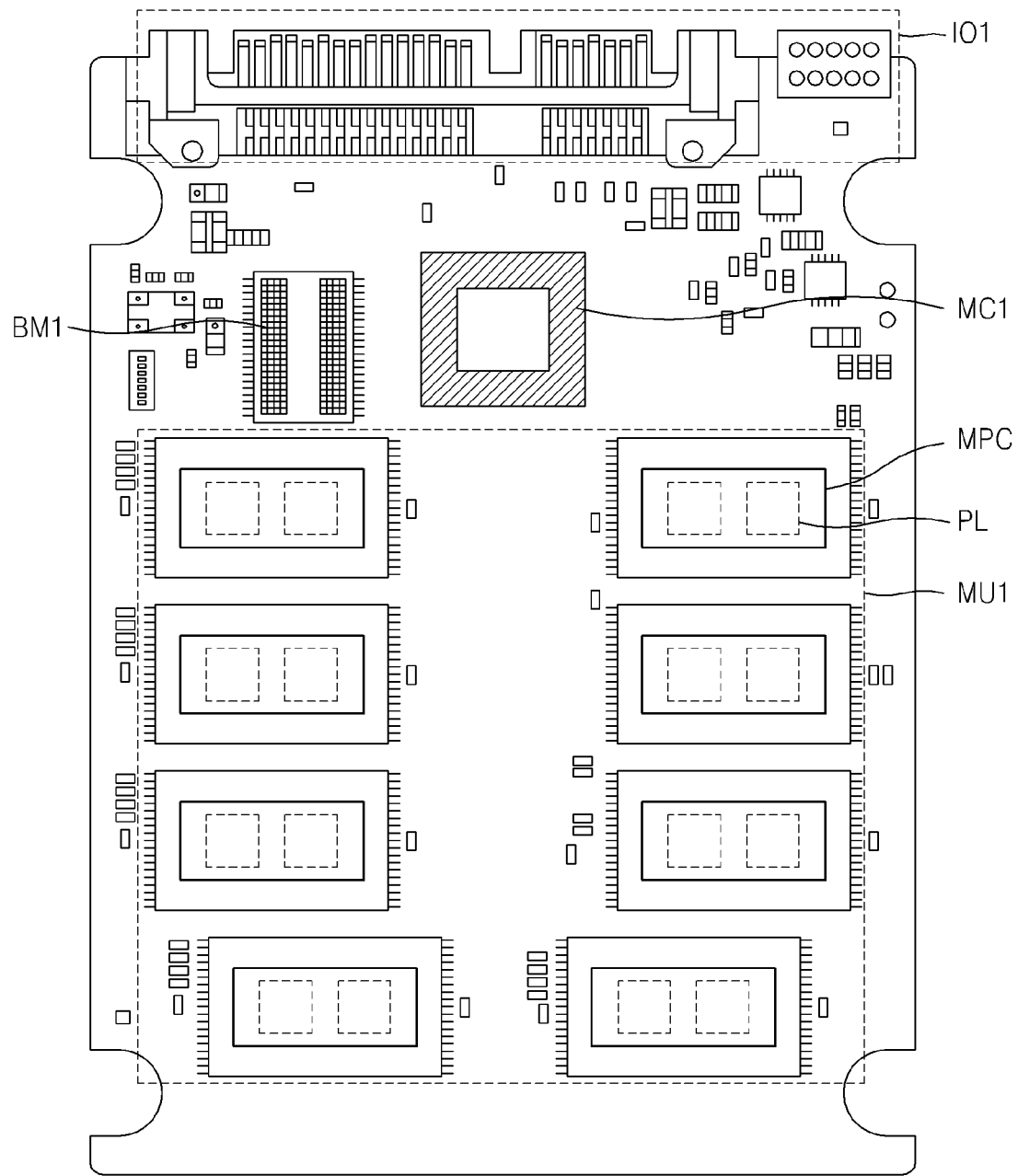

FIGS. 3 and 4 are schematic plane views of an SSS module that is an example of a storage module illustrated in FIG. 2, according to at least one example embodiment.

Referring to FIGS. 3 and 4, a first storage module SM1 may include a first input/output (I/O) unit 101, a first module controller MC1, a first memory unit MU1, and a first buffer memory BM1.

The first I/O unit 101 may establish data communication with the host controller HC of FIG. 1 or 2. That is, the first I/O unit 101 may receive data, which is to be written to the first memory unit MU1 or the first buffer memory BM1, from the host controller HC or may transmit data read from the first memory unit MU1 to the host controller HC. The first module controller MC1, the first memory unit MU1, and the first buffer memory BM1 are described above with reference to FIGS. 1 and 2.

As described above with reference to FIG. 2, the number of planes on a memory unit connected to a module controller may be equal to or greater than the number of pages included in storing units of partial data. For example, if a storing unit of first partial data PD1 is 64 KB and each page is 4 KB, then the number of pages included in the storing units may be sixteen. In this case, the first memory unit MU1 may include sixteen or more planes.

Planes of a memory unit may have any of various shapes. A memory unit may include a plurality of memory packages. Each of the plurality of packages may include at least one memory chip. At least one plane may be implemented in a memory chip. Each of the at least one memory chip may be, for example, a single-plane type memory chip SPC of FIG. 3, which includes, for example, only a single plane PL as illustrated in FIG. 3, or may be, for example, a multi-plane type memory chip MPC of FIG. 4, which includes a plurality of planes PL as illustrated in FIG. 4.

For example, the first memory unit MU1 may include sixteen planes, in which a memory chip included in each of a plurality of memory packages is a single-plane type memory chip. In this case, when eight memory packages are included in the first memory unit MU1 as shown in FIG. 3, each of the memory packages may include two single-plane type memory chips SPC. Each of the single-plane type memory chips may include one plane PL. Thus, to store the first partial data PD1, the sixteen memory chips may be provided to the first memory unit MU1. The first partial data PD1 of 64 KB may be stored in the first storage module SM1 by storing data fragments that are each 4 KB in the sixteen memory chips, respectively.

Alternatively, the first memory unit MU1 may include sixteen planes and a memory chip included in each of a plurality of memory packages may be a multi-plane type memory chip. In this case, as illustrated in FIG. 4, when eight memory packages are included in a first memory unit MU1, each of the eight memory packages may include one multi-plane type memory chip MPC. The multi-plane type memory chip may include two planes PL. Thus, to store first partial data PD1, eight memory chips may be provided to the first memory unit MU1. By storing data fragments that are each 4 KB in two planes included in each of the eight memory chips, respectively, the two data fragments may be stored in each of the memory chips. Accordingly, the first partial data PD1 that is 64 KB may be stored in the first storage module SM1.

Figure 5:
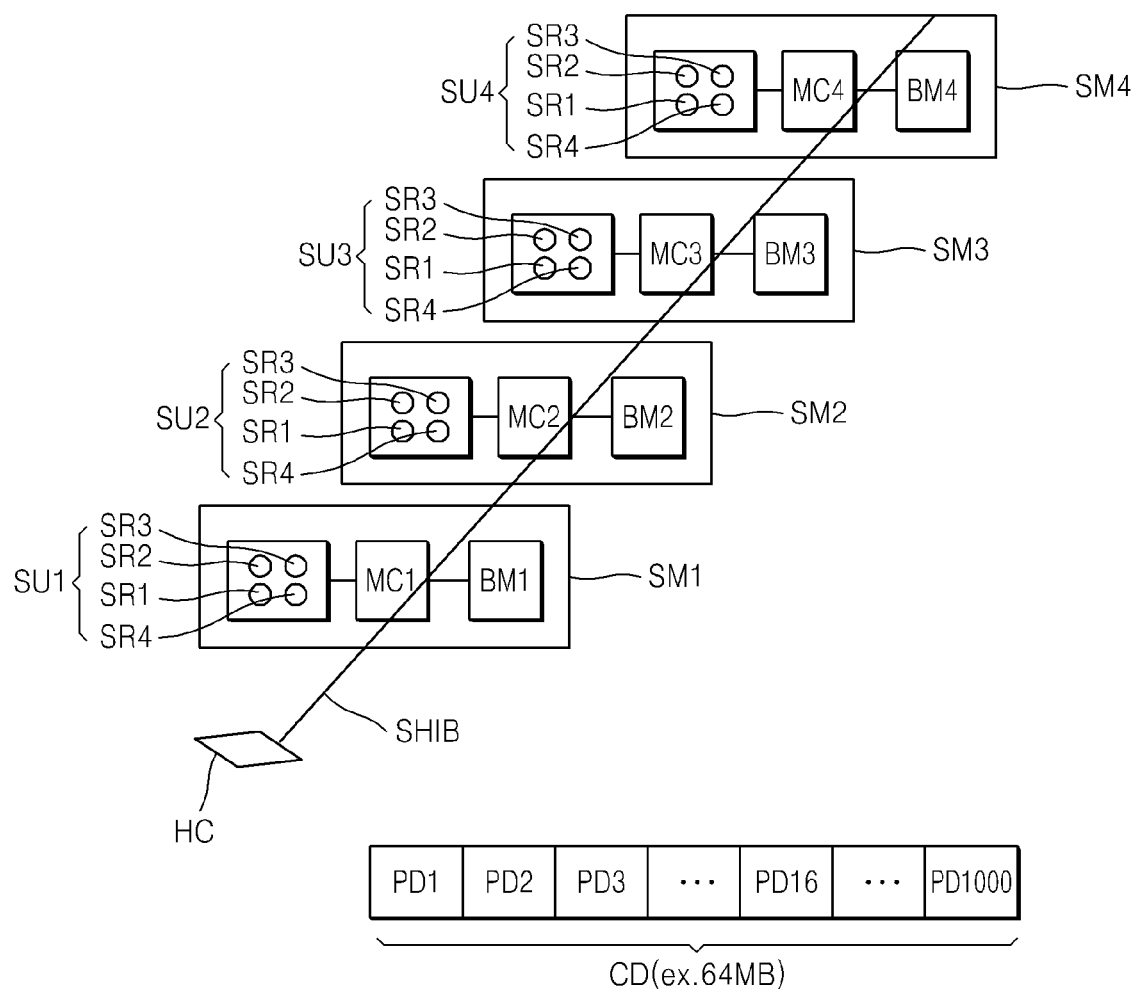
FIG. 5 is a schematic block diagram of a host device and a system including the same, according to at least one example embodiment.

FIG. 5 is a schematic block diagram of a host device HOST and a system including the same, according to at least one example embodiment.

Referring to FIG. 5, a storage module is not limited to an SSS module and may be embodied as any of other various storage devices. When data is written to storage modules SM, a host controller HC may be configured to sequentially write the data to prepared storage modules SM. To this end, the host controller HC may divide chunk data CD into a plurality of pieces of partial data, and may transmit the plurality of pieces of partial data to be distributed to the storage modules SM via a single host interface bus SHIB. Thus, the plurality of pieces of partial data may be divided and written to the storage modules SM.

For example, when the host controller HC desires to write chunk data CD of 64 MB to four storage modules SM, e.g., a first storage module SM1 to a fourth storage module SM4, the host controller HC may divide the chunk data CD into 1000 pieces of partial data, each of which is 64 KB, and may transmit the 1000 pieces of partial data to be distributed to the first to fourth storage modules SM1 to SM4.

In this case, first, the host controller HC may transmit four pieces of partial data, e.g., first partial data PD1 to fourth partial data PD4, to the first storage module SM1. The embodiment of FIG. 5 is compared with the embodiment of FIG. 1 in which it is assumed that only one piece of partial data is transmitted to the first storage module SM1. The first storage module SM1 may include a plurality of storage regions for storing pieces of partial data. For example, the first to fourth partial data PD1 to PD4 may be stored in a first storage region SR1 to a fourth storage region SR4 of the first storage module SM1, respectively. A first module controller MC1 may receive the first to fourth partial data PD1 to PD4 and write the first to fourth partial data PD1 to PD4 to the first to fourth storage regions SR1 to SR4, respectively.

Then, the host controller HC may transmit subsequent four pieces of partial data, e.g., fifth partial data PD5 to eighth partial data PD8, to the second storage module SM2. The transmitted pieces of partial data may be stored in a first storage region SR1 to a fourth storage region SR4 of the second storage module SM2, under control of a second module controller MC2. As described above, sixteen pieces of partial data may be transmitted to the first to fourth storage modules SM1 to SM4. Thus, the first to sixteenth partial data PD1 to PD16 may be written as shown in Table 3.

TABLE 3

|  | First Storage Unit SU1 | Second Storage Unit SU2 | Third Storage Unit SU3 | Fourth Storage Unit SU4 |
| --- | --- | --- | --- | --- |
| First Storage Region SR1 | First Partial Data PD1 | Fifth Partial Data PD5 | Ninth Partial Data PD9 | Thirteenth Partial Data PD13 |
| Second Storage Region SR2 | Second Partial Data PD2 | Sixth Partial Data PD6 | Tenth Partial Data PD10 | Fourteenth Partial Data PD14 |
| Third Storage Region SR3 | Third Partial Data PD3 | Seventh Partial Data PD7 | Eleventh Partial Data PD11 | Fifteenth Partial Data PD15 |
| Fourth Storage Region SR4 | Fourth Partial Data PD4 | Eighth Partial Data PD8 | Twelfth Partial Data PD12 | Sixteenth Partial Data PD16 |

As described above, among a plurality of pieces of partial data, e.g., 1000 pieces of partial data, the number of pieces of partial data, e.g., four pieces of partial data, corresponding to the number of storage regions, e.g., four storage regions, may be written to a storage unit SU included in each of the storage modules. To this end, the host controller HC may be configured to transmit the number of pieces of partial data corresponding to the number of the storage regions among the plurality of pieces of partial data, to the module controller included in each of the storage modules.

Thus, the host controller HC may be configured to substantially simultaneously write the amount of data corresponding to the product of the amount of partial data, the number of storage regions, and the number of storage modules. Referring to FIG. 5, since the size of partial data is 64 KB, the number of storage regions included in each of storage modules is four, and the number of storage modules is four, 64 KB×4×4=1024 KB, i.e., partial data of about 1 MB may be substantially simultaneously written.

While the first to sixteenth partial data PD1 to PD16 are written to the first to fourth storage modules SM1 to SM4, the host controller HC may write the remaining 984 pieces of additional partial data to the first to fourth storage modules SM1 to SM4 in a predetermined order. The first to fourth module controllers MC1 to MC4 may receive the 984 pieces of additional partial data and temporarily store the received additional partial data in a first buffer memory BM1 to a fourth buffer memory BM4. By repeatedly performing this process, the 1000 pieces of partial data may be sequentially written to the first to fourth storage modules SM1 to SM4 so that about 250 pieces of partial data may be written to each of the first to fourth storage modules SM1 to SM4.

In the case of related art, such as a Peripheral Component Interconnect Express (PCI-E), a Serial Advanced Technology Attachment (SATA), or a Universal Serial Bus (USB), only one storage module is connected to each host interface bus. Thus, when two or more storage modules are used, an additional host interface bus should be used. In order to increase the capacity of a storage module without using an additional host interface bus, the existing storage module should be removed and a high-capacity storage module should be connected to the host interface bus. However, although the capacity of the storage module is increased, a data transmission speed, e.g., a write speed, is not increased and a need to increase an operating speed is difficult to address.

However, since a host device and a system according to at least one example embodiment use a single shared interface bus, an additional storage module may be easily added to increase a storage capacity. Furthermore, as an additional storage module is added to increase a storage capacity, data may be written at a higher speed. For example, when eight storage modules are connected to the single host interface bus SHIB, 1000 pieces of partial data are sequentially written to the eight storage modules such that about 125 pieces of partial data may be written to each of the eight storage modules. Accordingly, data may be written at a speed that is, for example, two times faster than in the embodiment of FIG. 5 in which the four storage modules SM1 to SM4 are connected to the single host interface bus SHIB.

Figure 6:
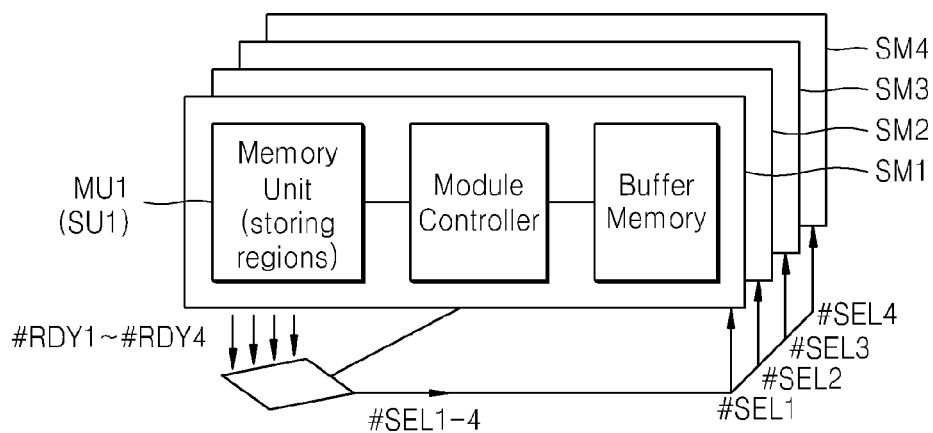
FIG. 6 is a schematic block diagram of a host device and a system including the same, according to at least one example embodiment.

FIG. 6 is a schematic block diagram of a host device and a system including the same, according to at least one example embodiment. The host device and the system of FIG. 6 may be a modified example of those of FIGS. 2 and 5. A descriptions of aspects of the host device and the system of FIG. 6 that are the same as those of the host devices and the systems of FIGS. 2 and 5 are not described again here.

Referring to FIG. 6, a host controller may be configured to divide and write chunk data to a first storage module SM1 to a fourth storage module SM4. As described above with reference to FIG. 2, the host controller may divide pieces of chunk data into a plurality of pieces of partial data, and may transmit one of the plurality of pieces of partial data to a memory unit included in a storage module, e.g., a first memory unit MU1 included in a first storage module SM1. Alternatively, as described above with reference to FIG. 4, the host controller may divide pieces of chunk data into a plurality of pieces of partial data, and transmit pieces of partial data, e.g., four pieces of partial data, among the plurality of pieces of partial data to storage regions of a storage unit included in a storage module, e.g., the first to fourth storage regions SR1 to SR4 of the first storage unit SU1 included in the first storage module SM1 (see FIG. 4).

Each of the storage modules may be selected according to a selection signal. For example, the first to fourth storage modules SM1 to SM4 may be respectively activated or deactivated according to a first selection signal SEL1 to a fourth selection signal SEL4 so as to perform a write/read operation. During the write/read operation, the first to fourth storage modules SM1 to SM4 may transmit preparation signals that are in a first state, e.g., first to fourth preparation signals #RDY1 to #RDY4, to the host controller thereof, respectively.

For example, if the first storage module SM1 and the third storage module SM3 are deactivated, the first storage module SM1 and the third storage module SM3 may transmit the first preparation signal #RDY1 and the third preparation signal #RDY3 having logic low that are in the second state, to the host controller thereof, respectively. In this case, the host controller may transmit pieces of partial data to the first storage module SM1 and the third storage module SM3, and the module controllers in the respective first storage module SM1 and the third storage module SM3 receive the pieces of partial data and write the pieces of partial data to memory units (or storage units) thereof.

While the first storage module SM1 and the third storage module SM3 are activated to perform the write operation, the first storage module SM1 and the third storage module SM3 may transmit the first preparation signal #RDY1 and the third preparation signal #RDY3 having logic high that are in a to the host controller thereof, respectively. In this case, the host controller may transmit pieces of additional partial data to the first storage module SM1 and the third storage module SM3, and the module controllers in the respective first storage module SM1 and the third storage module SM3 may receive the pieces of additional partial data and store them in buffer memories thereof.

Figure 7:
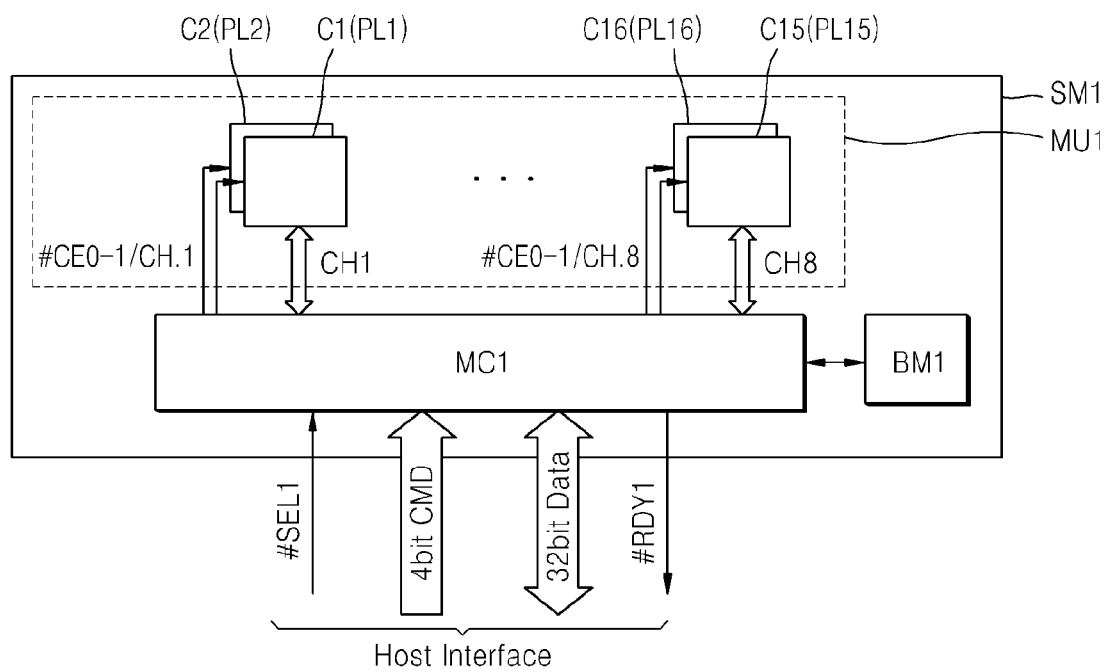
FIG. 7 is a schematic block diagram of a storage module according to at least one example embodiment.

FIG. 7 is a schematic block diagram of a storage module according to at least one example embodiment. The storage module according to the current embodiment may be, for example, the first storage module SM1 used in the host device and the system of FIG. 6. Further, though the first storage module SM1 of FIG. 6 is used as an example, any of the storage modules SM of FIG. 6 may have the same structure and operation as that described below with respect to the first storage module SM1 of FIG. 6.

Referring to FIG. 7, the first storage module SM1 may include a first module controller MC1, a first memory unit MU1, and a first buffer memory BM1. Operations of these elements may be the same as or similar to those of the first module controller MC1, the first memory unit MU1, and the first buffer memory BM1 of the first storage module SM1 described above with reference to FIG. 2. Thus, aspects of these elements that are the same as those of the first module controller MC1, the first memory unit MU1, and the first buffer memory BM1 of the first storage module SM1 described above with reference to FIG. 2 are not described again here.

The first module controller MC1 may be connected to a plurality of channels. For example, the first module controller MC1 may be connected to a first though eight channels CH1 to CH8, and two semiconductor chips may be connected to each of the first to eighth channels CH1 to CH8. A first memory chip C1 and a second memory chip C2 are connected to the first channel CH1, and are respectively activated or deactivated according to a first chip enable signal #CE0/CH1 and a second chip enable signal #CE1/CH1 to perform a write/read operation. Similarly, two semiconductor chips are connected to each channel. For example, a fifteenth semiconductor chip C15 and a sixteenth semiconductor chip C16 are connected to the eighth channel CH8. The two semiconductor chips may be activated or deactivated, for example, according to a fifteenth chip enable signal #CE0/CH8 and a sixteenth chip enable signal #CE1/CH8, respectively.

As described above with reference to FIG. 6, the first storage module SM1 may be activated or deactivated when a first selection signal #SEL1 is input thereto. The first module controller MC1 of the first storage module SM1 may transmit a preparation signal #RDY1 that is in a first state to a host controller (not shown) during a write/read operation, and may transmit the preparation signal #RDY1 that is in a second state to the host controller when the write/read operation is completed. In addition, the first module controller MC1 may receive a 4-bit command signal and transmit or receive a 32-bit data signal, via the single host interface bus SHIB of FIG. 1, 2, or 5.

Figure 8:
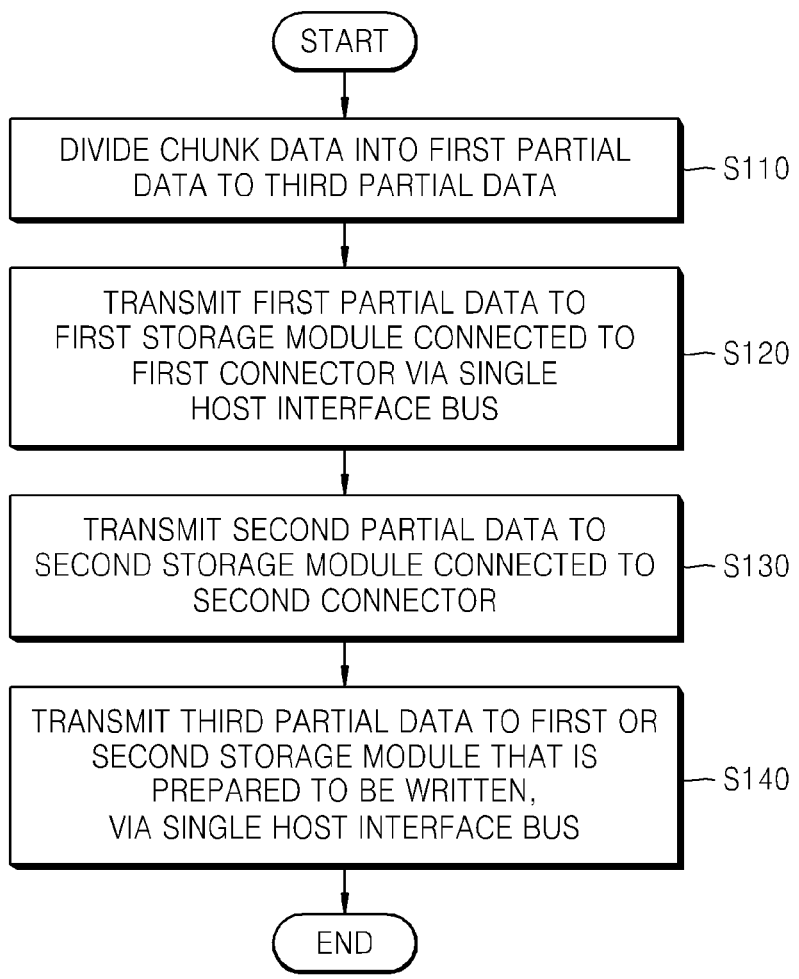
FIG. 8 is a flowchart schematically illustrating a data transmission method according to at least one example embodiment.

FIG. 8 is a flowchart schematically illustrating a data transmission method according to at least one example embodiment. FIG. 8 schematically illustrates a data transmission operation performed by a host controller.

Referring to FIG. 8, first, chunk data is divided into first partial data to third partial data (operation S110). Then, the first partial data is transmitted to a first storage module connected to a first connector via a single host interface bus (operation S120). When the first partial data is transmitted to the first storage module, a first write operation is performed to write the first partial data to the first storage module.

After operation S120, second partial data is transmitted to a second storage module connected to a second connector via the single host interface bus (operation S130). When the second partial data is transmitted to the second storage module, a second write operation is performed to write the second partial data to the second storage module. As described above with reference to FIG. 2, since the second partial data is transmitted at a very high speed in operation S130, the second write operation may begin before the first write operation is completed. Thus, the first write operation and the second write operation may be performed simultaneously, i.e., in parallel.

Then, third partial data is transmitted to the storage module from among the first storage module and the second storage module that is prepared to perform writing thereon, via the single host interface bus (operation S140. For example, the host controller may transmit the third partial data to the first storage module or the second storage module that earlier generates a preparation signal that is in a first state.

Figure 9:
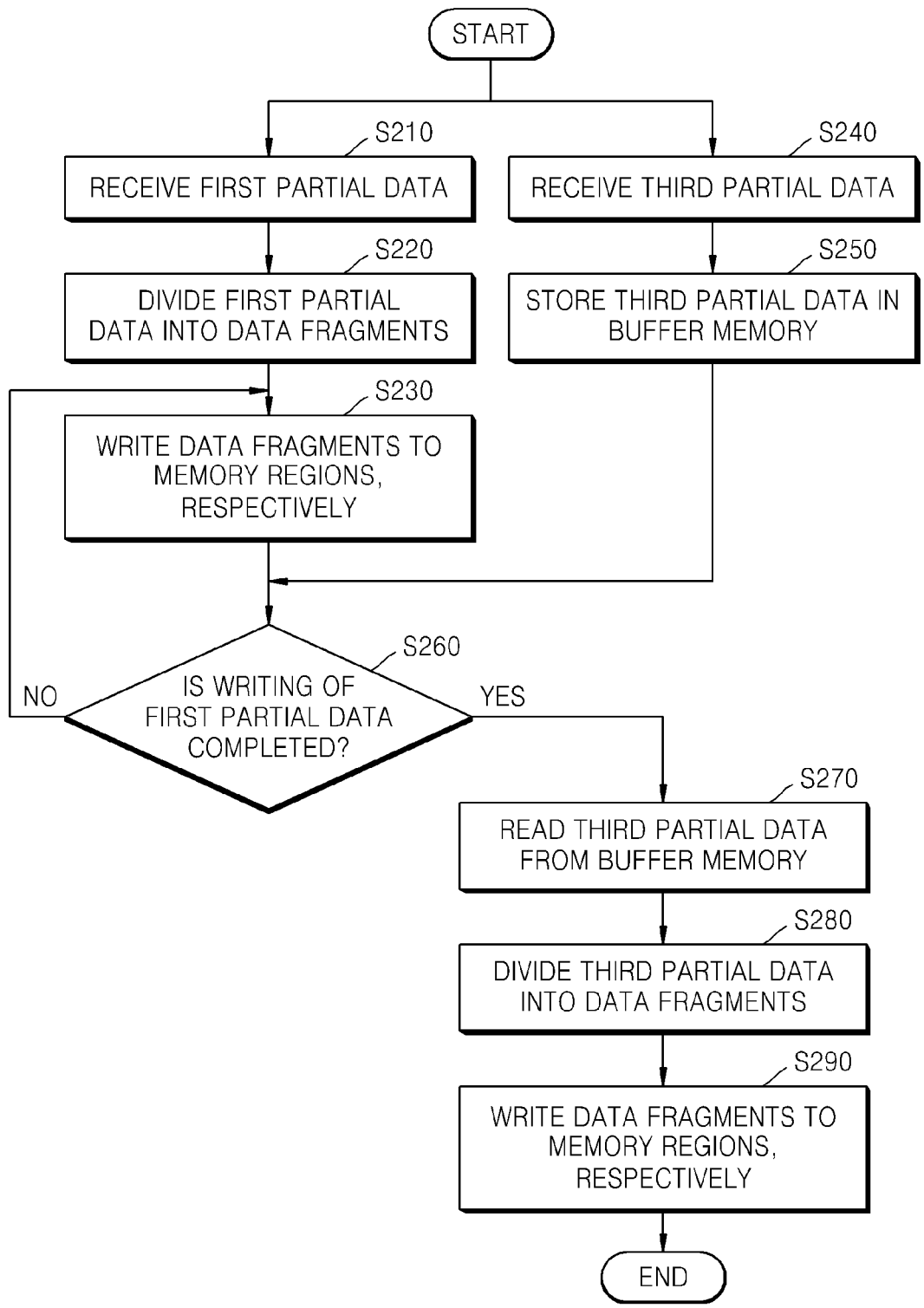
FIG. 9 is a flowchart schematically illustrating a data transmission method according to at least one example embodiment.

FIG. 9 is a flowchart schematically illustrating a data transmission method according to at least one example embodiment. FIG. 9 schematically illustrates a data transmission operation performed by a storage module.

Referring to FIG. 9, first, first partial data is received (operation S210). Then, the first partial data is divided into a plurality of data fragments (operation S220). Then, the plurality of data fragments are written to a plurality of memory regions, respectively (operation S230). In some modified examples of the current embodiment, writing of the first partial data to a storage region may be performed instead of operations S220 and S230.

After operation S210, third partial data is received (operation S240). After operation S240, the third partial data is stored in a buffer memory (operation S250).

It is determined whether the writing of the first partial data is completed (operation S260). If it is determined in operation S260 that the writing of the first partial data is completed, the third partial data is read from the buffer memory and is then written to the plurality of memory regions (operation S270). During the writing of the third partial data, the third partial data is divided into a plurality of data fragments (operation S280), and then, the plurality of data fragments are written to the plurality of memory regions, respectively (operation S290).

Figure 10:
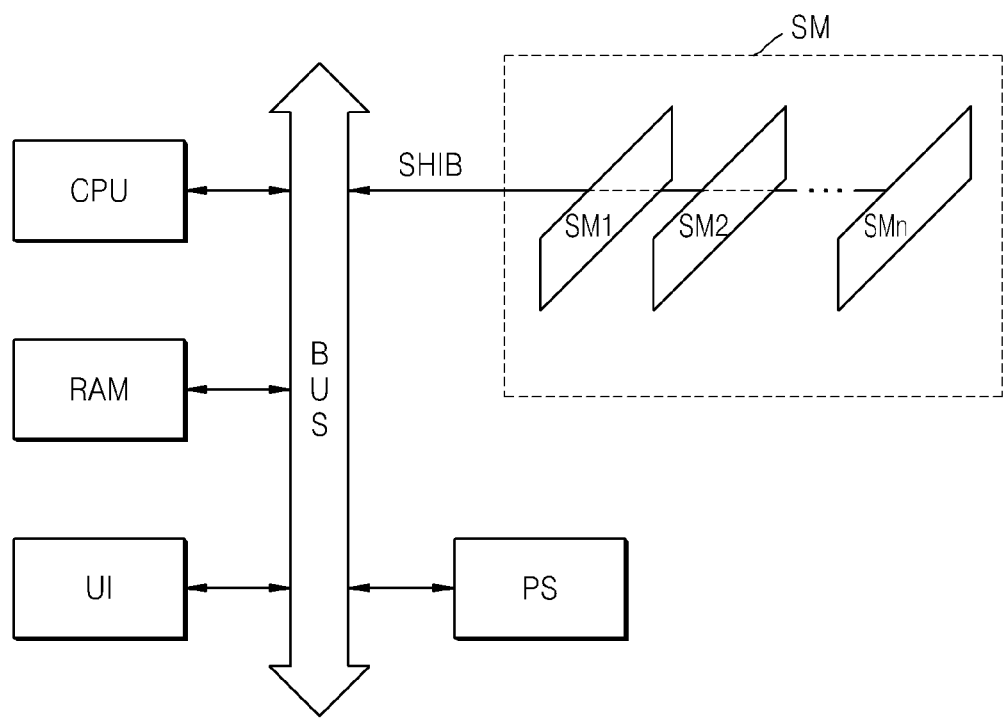
FIG. 10 is a block diagram of a computing system including a memory device, according to at least one example embodiment.

FIG. 10 is a block diagram of a computing system including a memory device, according to at least one example embodiment.

Referring to FIG. 10, the computing system may include a central process unit (CPU), a random access memory (RAM), a user interface (UI), a power source (PS), and storage modules SM. The storage modules SM are electrically connected to the CPU, the RAM, the UI, and the PS via a system bus BUS. Chunk data provided or processed via the UI may be stored in the storage modules SM. As describe above, the chunk data may be divided and stored in the storage modules SM, e.g., storage modules SM1, SM2, . . . , SMn, via the single host interface bus SHIB of FIG. 1, 2, or 5.

The storage modules SM may be embodied, for example, SSS modules, and memory units included in the respective SSS modules may be embodied as flash memory units. Also, each of the flash memory units may be embodied as a three-dimensional (3D) flash memory device in which a plurality of memory cells are vertically stacked.

Although not shown, the system may further include an application chipset, a camera image processor, and the like. Also, the computing system may be embodied as a mobile device. In this case, a battery that applies operating voltage to the computing system and a modem, e.g., a baseband chip set, may be additionally provided.

Figure 11:
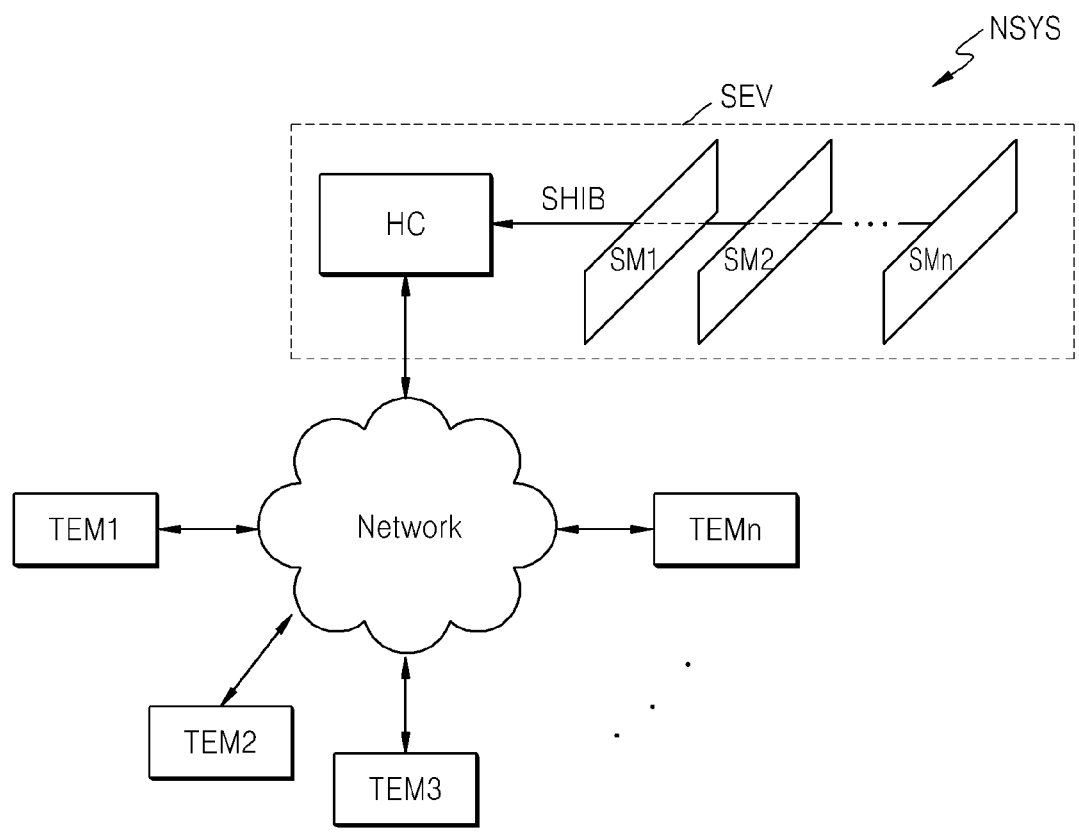
FIG. 11 illustrates a server including storage modules and a network system including the same, according to at least one example embodiment.

FIG. 11 illustrates a server including storage modules SM and a network system NSYS including the same, according to at least one example embodiment.

Referring to FIG. 11, the network system NSYS may include a server system SEV and a plurality of terminals TEM1 to TEMn connected via a network. According to at least one example embodiment, the server system SEV may include a host controller that handles requests from the plurality of terminals TEM1 to TEMn connected thereto via the network, and storage modules that store chunk data corresponding to the requests from the plurality of terminals TEM1 to TEMn. As described above, the chunk data may be divided and stored in the storage modules, e.g., storage modules SM1, SM2, . . . , SMn, via the single host interface bus SHIB of FIG. 1, 2, or 5.

Figure 12:
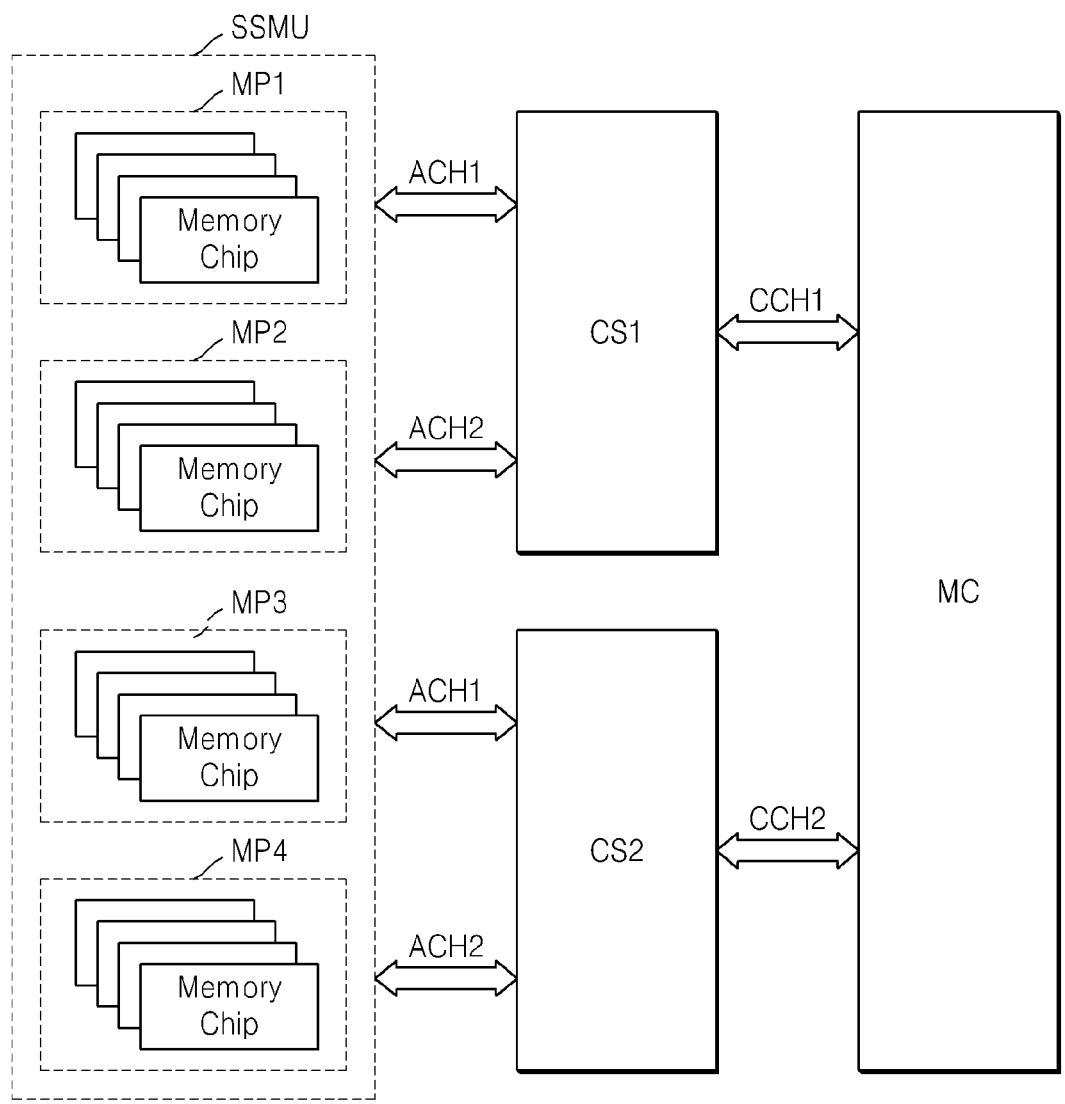
FIG. 12 is a schematic block diagram of an SSS module according to at least one example embodiment.

FIG. 12 is a schematic block diagram of an SSS module according to at least one example embodiment.

Referring to FIG. 12, the SSS module may be, for example, an SSS module using a NAND flash element. The SSS module may include a module controller MC, a memory unit SSMU including a plurality of memory chips, and a plurality of crossbar switches CS1 and CS2.

The module controller MC is connected to a host interface bus (not shown), and is configured to receive data from a host controller (not shown) and write the data to the memory unit SSMU. Also, the module controller MC may read data from the memory unit SSMU and transmit the data to the host controller via the host interface bus.

The memory unit SSMU is a place in which data received from the host controller is stored, and may be embodied as a flash memory unit. For example, the flash memory unit may be embodied as a 3D flash memory element in which a plurality of memory cells are vertically stacked.

The crossbar switches CS1 and CS2 may be disposed between the memory unit SSMU and the module controller MC. When the module controller MC writes data to or reads data from the memory unit SSMU, the module controller MC may access the memory unit SSMU via the crossbar switches CS1 and CS2.

For example, the module controller MC may be connected to the first crossbar switch CS1 via a first controller channel CCH1, and may be connected to the second crossbar switch CS2 via a second controller channel CCH2. A first memory package MP1 including four memory chips may be connected to the first crossbar switch CS1 via a first array channel ACH1. A second memory package MP2 including four memory chips may be connected to the first crossbar switch CS1 via a second array channel ACH2. Similarly, the module controller MC may be connected to a third memory package MP3 and a fourth memory package MP4 via the second crossbar switch CS2 connected to the second controller channel CCH2.

Figure 13:
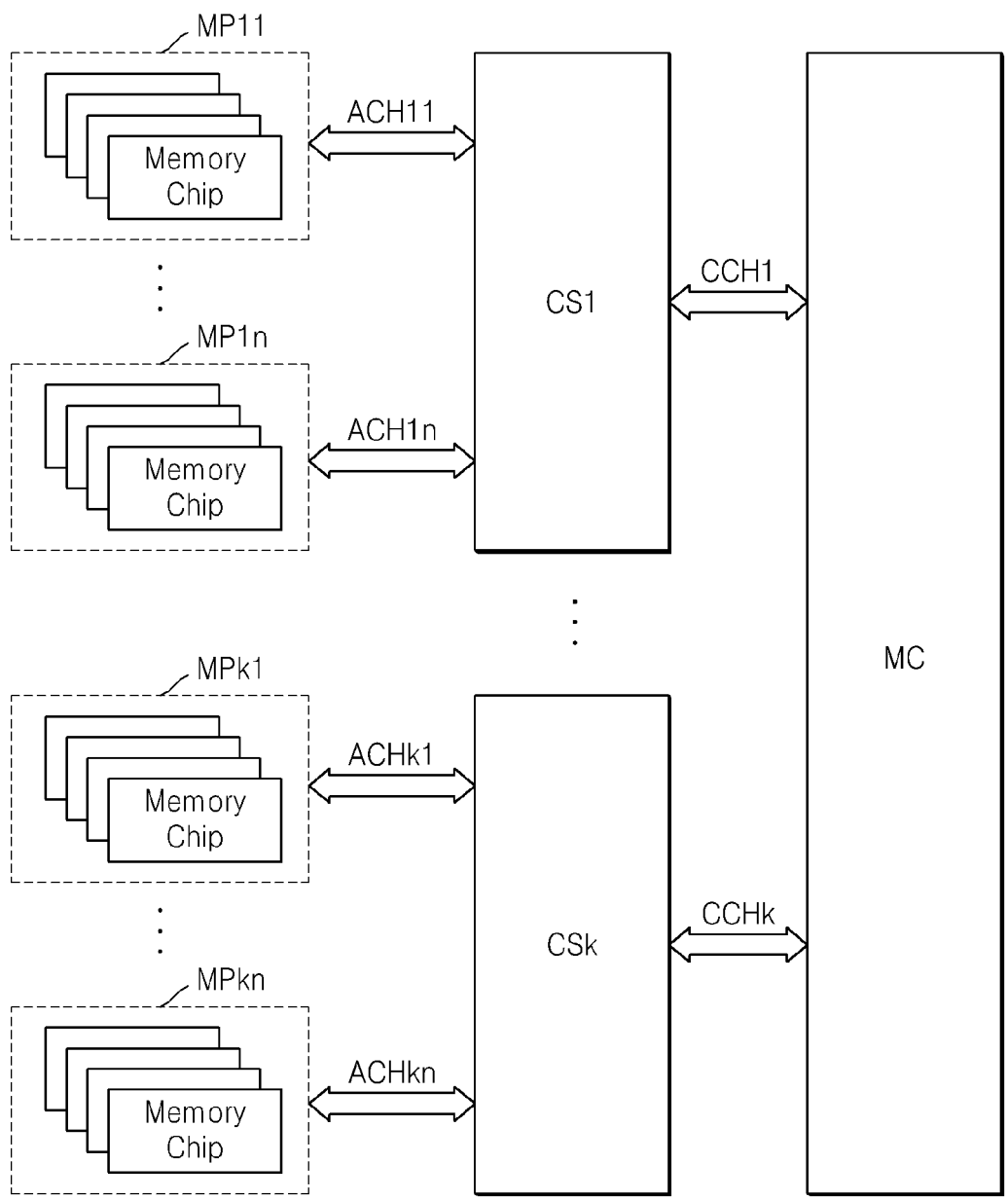
FIG. 13 is a schematic block diagram of an SSS module according to at least one example embodiment.

FIG. 13 is a schematic block diagram of an SSS module according to at least one example embodiment. FIG. 13 is a diagram generalizing the SSS module of FIG. 12.

Referring to FIG. 13, the SSS module may include (n×k) memory packages MP11, . . . , MP1n, . . . , MPk1, . . . , MPkn. A module controller MC may be connected to a first crossbar switch CS1 to a $k^{th}$ crossbar switch CSk.

The module controller MC may be connected to the first crossbar switch CS1 via a first controller channel CCH1. To connect the module controller MC and these memory packages, the $[1,1]^{th}$ memory package MP11 may be connected to the first crossbar switch CS1 via a $[1,1]^{th}$ array channel ACH11. The $[1,n]^{th}$ memory package MP1n may be connected to the first crossbar switch CS1 via a $[1,n]^{th}$ array channel ACH1n.

Also, the module controller MC may be connected to the $k^{th}$ crossbar switch CSk via a $k^{th}$ controller channel CCHk. To connect the module controller MC and these memory packages, the $[k,1]^{th}$ memory package MPk1 may be connected to the $k^{th}$ crossbar switch CSk via a $[k,1]^{th}$ array channel ACHk1. The $[k,n]^{th}$ memory package MPkn may be connected to the $k^{th}$ crossbar switch SCk via a $(k,n)^{th}$ array channel ACHkn.

In the case of a prior art that does not using crossbar switches, the (n×k) array channels ACH11, . . . , ACH1n, . . . , ACHk1, . . . , ACHkn should be connected to a module controller MC. Thus, a very large number of pins should be included in the module controller MC. For example, if only one pin is required for one channel, e.g., an array channel or a controller channel, (n×k) pins should be included in the module controller MC. In particular, when the number of memory packages, e.g., n, or the number of channels, e.g., k, is increased, the number of pins is increased exponentially.

However, in the case of an SSM module according to at least one example embodiment, the crossbar switches CS1 to CSk are disposed between the memory packages MP11 to MPkn and the module controller MC, thereby greatly reducing the number of pins required. For example, when only one pin is required for one channel, e.g., an array channel or a controller channel, it is sufficient that (n) pins are included in one crossbar switch and k pins are included in the module controller MC. Thus, the number of pins included in the module controller MC may be greatly reduced.

Figure 14:
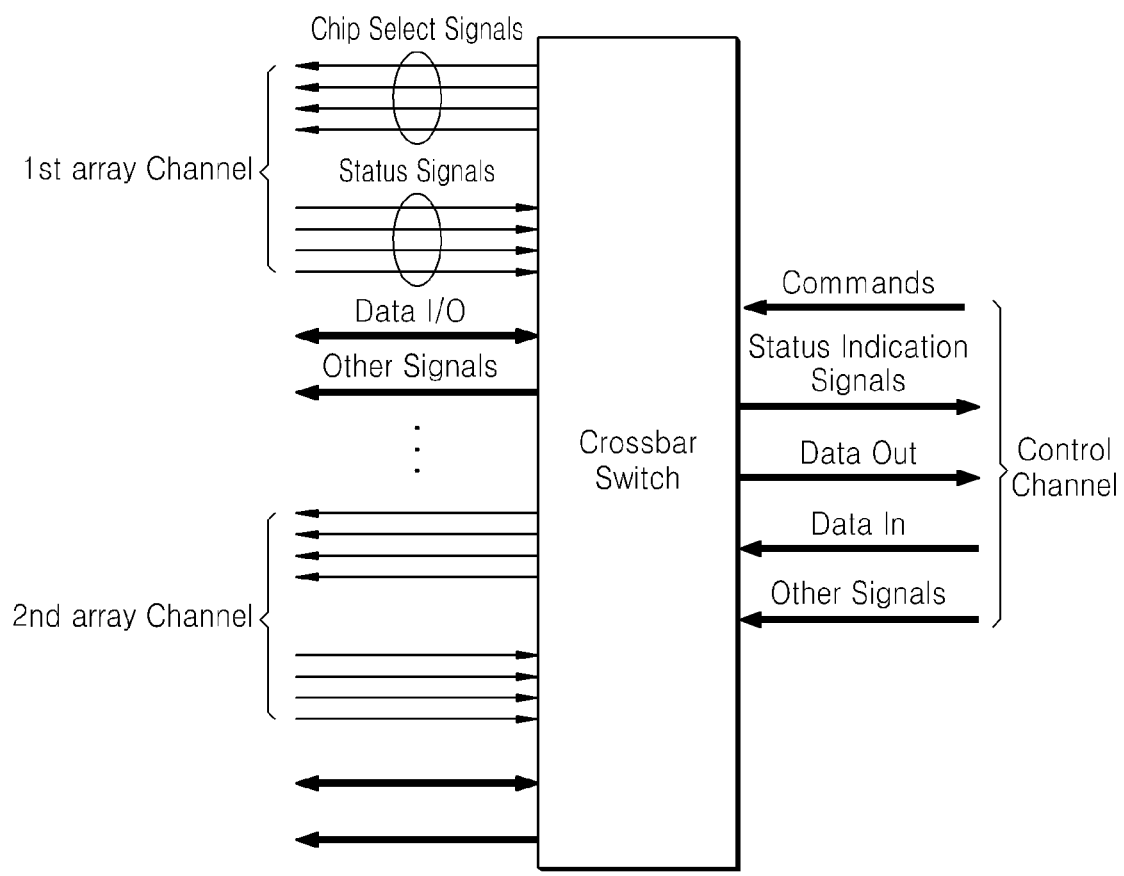
FIG. 14 is a block diagram illustrating signals input to and output from a crossbar switch such as shown in FIG. 12 or 13.

FIG. 14 is a block diagram illustrating signals input to and output from a crossbar switch such as shown in FIG. 12 or 13.

Referring to FIG. 14, the crossbar switch includes array channels capable of accessing memory units. Each of the array channels may be connected to a plurality of memory chips. Chip select signals, status signals, data I/O signals, and other signals may be transmitted to the memory units via each of the array channels.

The chip selection signals enable to access memory chips of each of memory units, and may include, for example, a control signal for controlling I/O signals and a control signal for controlling operations of the memory chips. The status signals may include, for example, a signal indicating that a write/read operation is in progress or is completed. The data I/O signals are signals that constitute input/output data. The other signals may include, for example, signals for controlling the write/read operation.

Optionally, the plurality of memory chips may share the data I/O signals and the other signals via one array channel but may not share the chip selection signals and the status signals. In this case, each of the chip selection signals and each of the status signals may be supplied in each of the plurality of memory chips.

Signals communicated between the crossbar switch and a module controller may include a signal that the module controller uses to access the crossbar switch, e.g., a crossbar switch selection signal for controlling an operation of the cross switch, a data input signal, a data output signal, command signals including operation and address information, a status indication signal, a clock signal, and the like. The status indication signal may be defined as a signal indicating a status as to whether the module controller may access a target memory package via the crossbar switch.

The module controller may perform memory unit accessing and a desired data management function, e.g., reading, writing, block data management, an error correcting code (ECC) function, or the like. Also, in order to communicate with a memory unit connected to the crossbar switch, the module controller may communicate with the crossbar switch by using signals that the crossbar switch requires to access the memory unit.

To write data to or read data from the memory unit, the module controller supplies the crossbar switch selection signal to the crossbar switch, and at the same time, supplies command signals, e.g., a write/read signal and an address signal, to the crossbar switch.

The command signals may include a signal indicating that a memory chip is to be activated among memory chips of memory packages connected to array channels. The crossbar switch decodes this signal, and determines and activates a memory chip on which the module controller is to perform a write/read operation, i.e., a target memory chip in a desired array channel.

Then, the module controller may transmit a command signal including information about a desired operation, e.g., writing (or programming), reading, or erasing, to be performed on the target memory chip, to the crossbar switch. Then, the module controller may transmit a command signal including address information about memory chip accessing, to the target memory chip. The crossbar switch may sequentially decode the command signals, and perform a desired operation, e.g., writing, reading, or erasing, on the target memory chip.

For example, when writing (or programming) is performed on the target memory unit, the module controller may write data to the crossbar switch via a data-in port. The crossbar switch may receive the write data and perform a write operation of storing the write data in the target memory chip that is prepared to perform writing thereon. When the write operation begins, a status signal, e.g., a RDY/#BSY signal that is in a first state, about the target memory chip may be input to the crossbar switch. The crossbar switch may decode the status signal and transmit a result of the decoding to the module controller so as to inform the module controller of a fact that the write operation is being performed.

Optionally, during the write operation, the crossbar switch may decode signals including status signals about other memory chips, together with a status signal about the target memory chip, and transmit results of the decoding to the module controller. Thus, a status indication signal including not only an operating state of the target memory chip but also operating states of other memory chips connected to other array channels may be generated, and transmitted to the module controller.

After performing of the write operation on the target memory chip is completed, a status signal about the target memory chip, e.g., a RDY/#BSY signal that is in a second state, may be input to the crossbar switch. The crossbar switch may decode the status signal and transmit a result of the decoding to the module controller so as to inform the module controller of a fact that the performing of the writing operation on the target memory chip is completed.

During a read operation, the module controller may generate a command signal for selecting an array channel, and transmit the command signal to a corresponding crossbar switch. Then, the module controller may transmit a command signal for selecting a target memory chip in the selected array channel and a command signal including an address signal of a block or a page of the target memory chip to be read, to the crossbar switch. The crossbar switch may decode the command signals and activates the target memory chip from which the module controller desires to read data.

When the data is read from the target memory chip and is prepared to be transmitted to the crossbar switch, a status signal about the target memory chip is output and is then input to the crossbar switch. The status signal is decoded to generate a signal indication signal indicating that crossbar switch is prepared to transmit the data. The state indication signal may be transmitted to the module controller. The module controller may receive the data read from the target memory chip from the crossbar switch by receiving the state indication signal.

Figure 15:
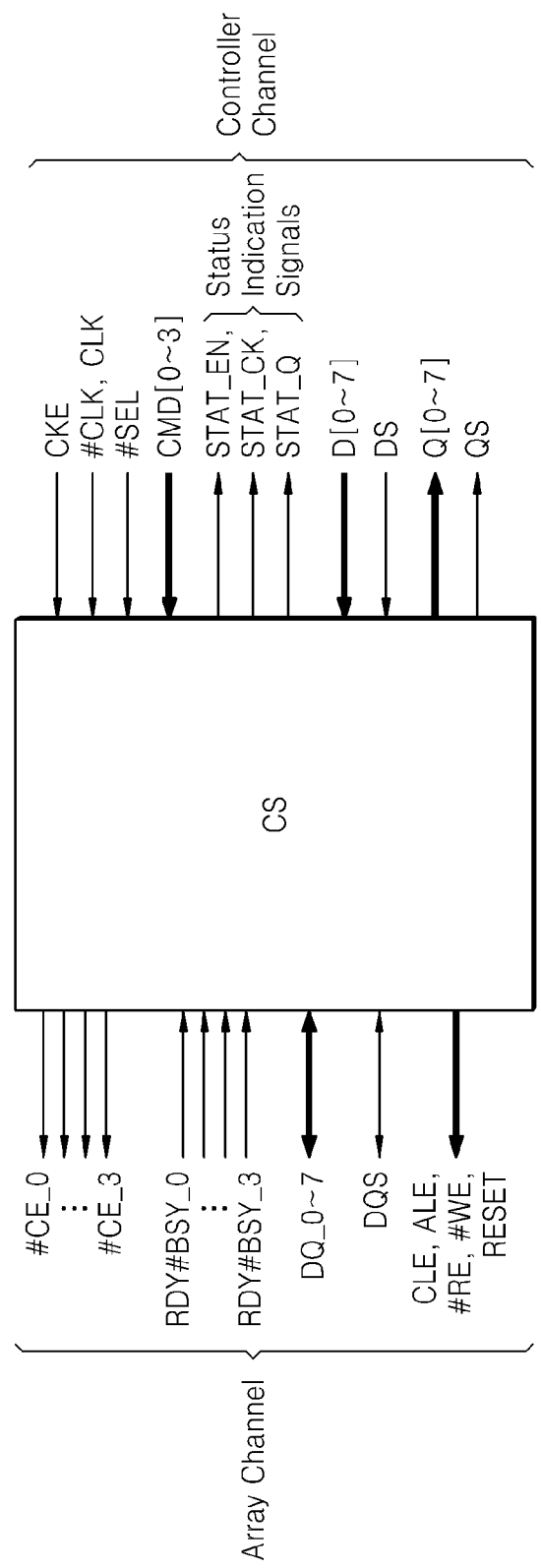
FIG. 15 is a schematic block diagram of a crossbar switch according to at least one example embodiment.

FIG. 15 is a schematic block diagram of a crossbar switch CS according to at least one example embodiment.

Referring to FIG. 15, the crossbar switch CS may be a NAND flash crossbar switch connected between a NAND flash memory unit and a NAND flash module controller.

First, signals that constitute an array channel of a memory unit will be described. The signals that constitute the array channel may include chip enable signals #CE_0 to #CE_3, status signals RDY/#BSY_0 to RDY/#BSY_3, data signals DQ_0 to DQ_7 and DQS, and other signals CLE, ALE, #RE, #WE, and RESET. As described above, a plurality of memory chips may share the data signals DQ_0 to DQ_7 and DQS and the other signals CLE, ALE, #RE, #WE, and RESET, but may not share the chip selection signals #CE_0 to #CE_3 and the status signals RDY/#BSY_0 to RDY/#BSY_3. The chip selection signals #CE_0 to #CE_3 and the status signals RDY/#BSY_0 to RDY/#BSY_3 may be divided and supplied in units of memory chips.

Next, signals that constitute a controller channel of a module controller will be described. The signals that constitute the controller channel may include clock signals CKE, #CLK, and CLK, a crossbar switch selection signal #SEL, a command signal CMD[0-3], state indication signals STAT_EN, STAT_CK, and STAT_Q, data input signals D[0-7] and DS, and data output signals Q[0-7] and QS.

Among the clock signals CKE, #CLK, and CLK, the clock signal CLK activates or deactivates the other clock signals #CLK and CLK. The crossbar switch CS may be activated when the clock signal CKE is activated and may be deactivated when the clock signal CKE is deactivated. The clock signals #CLK and CLK make the signals that constitute the array channel be synchronized.

The crossbar switch CS may be selected according to the crossbar switch selection signal #SEL. The module controller may control the crossbar switch CS by using the crossbar switch selection signal #SEL.

The command signal CMD[0-3] may include signals for performing a write operation, a read operation, and an erase operation. For example, the signals may include information about a target channel of the memory unit, information about memory chips in the target channel, address information about the memory chip, and the like.

The state indication signals STAT_EN, STAT_CK, and STAT_Q indicate whether a write/read operation is prepared to be performed on memory chips. According to an accessing request from the module controller, the state indication signals STAT_EN, STAT_CK, and STAT_Q including information about whether the memory chips are prepared may be transmitted to the module controller. The state indication signals STAT_EN, STAT_CK, and STAT_Q will be described in detail with reference to FIGS. 16 and 17 below.

The data input signals D[0-7] and DS and the data output signals Q[0-7] and QS may include signals enabling data to be transmitted and synchronized during a write/read operation. Although in the current embodiment, the data input signals and the data output signals are differentiated from one another, the data input signals and the data output signals may be transmitted via the same data pins, e.g., data pins DQ[0-7] and DQS, according to at least one example embodiment.

Although not shown, the crossbar switch CS may include a first decoder (not shown). The first decoder may generate a state indication signal by decoding a status signal output from a memory unit. The crossbar switch CS may transmit the state indication signal to the module controller.

The crossbar switch CS may also include a second decoder (not shown). The second decoder may generate a chip enable signal by decoding a command signal output from the module controller. The crossbar switch CS may transmit the chip enable signal to the memory unit.

Figure 16:
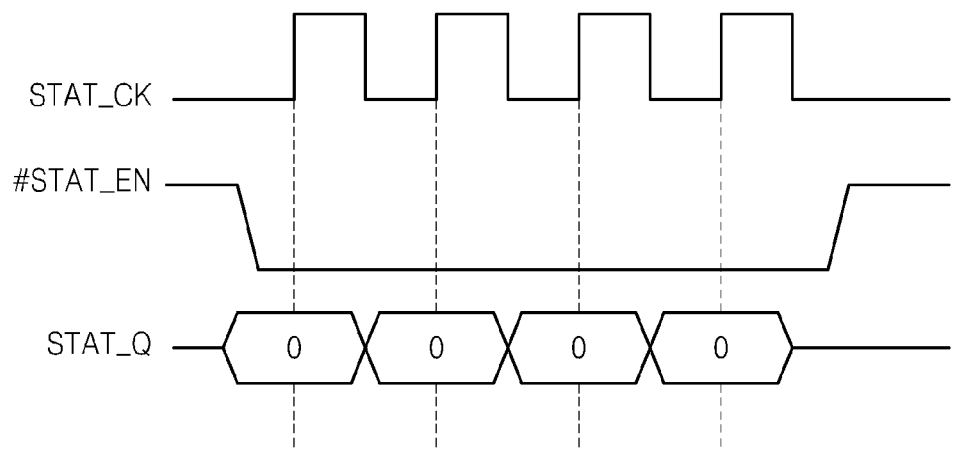
FIGS. 16 and 17 are timing diagrams of state indication signals according to at least one example embodiment.
Figure 17:
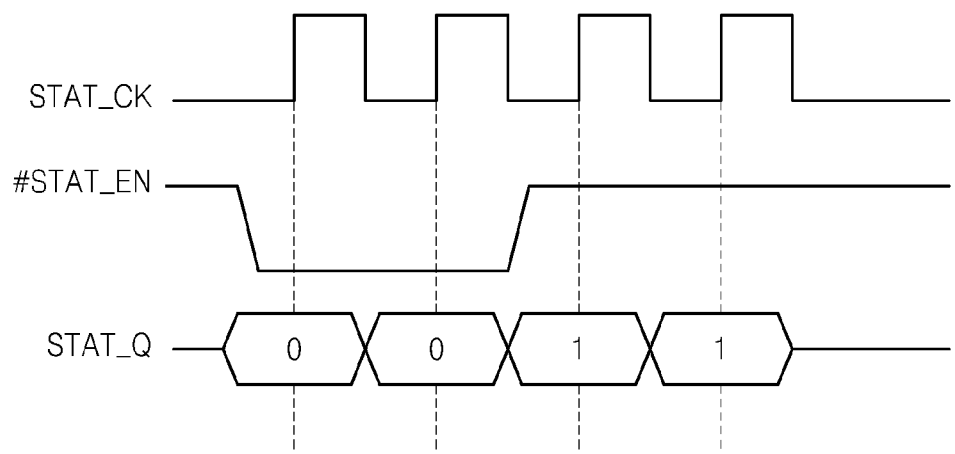

FIGS. 16 and 17 are timing diagrams of state indication signals according to at least one example embodiment.

FIGS. 16 and 17 are graphs schematically illustrating state indication signals output from a crossbar switch such as shown in FIG. 15. The crossbar switch may be connected to four memory packages via four array channels. Each of the memory packages may include four memory chips. Thus, the crossbar switch may perform a read/write/erase operation on a total of sixteen memory chips.

Referring back to FIG. 15, for example, during a read operation, the module controller may activate the crossbar switch CS by supplying a crossbar switch selection signal #SEL to the crossbar switch CS. At the same time, the module controller may supply a command signal to the crossbar switch CS. The crossbar switch CS may decode the command signal and transmit a chip enable signal and an address to a memory chip.

For example, if the command signal instructs data to be read from a first memory chip among sixteen memory chips connected to the crossbar switch CS, then the crossbar switch CS may generate, for example, a chip enable signal #CE_0 for the first memory chip and an address signal thereof by decoding the command signal, and may transmit the chip enable signal #CE_0 and the address signal to the first memory chip.

The first memory chip receives the chip enable signal #CE_0 and the address signal and performs a read operation. During the read operation, the first memory chip may generate, for example, a status signal RDY/#BSY_0, and transmit the RDY/#BSY_0 to the crossbar switch CS.

The status signal RDY/#BSY_0 transmitted to the crossbar switch CS may be decoded into state indication signals #STAT_EN, STAT_CK, and STAT_Q. The state indication signals #STAT_EN, STAT_CK, and STAT_Q are transmitted to the module controller, and the module controller determines that data requested (read) by itself is being prepared by parsing these state indication signals.

The state indication signals #STAT_EN, STAT_CK, and STAT_Q related to the read operation performed on the first memory chip are illustrated in FIG. 16. When the read operation is performed on the first memory chip and, for example, the status signal RDY/#BSY_0 is output from the first memory chip, the module controller may decode this status signal and then output the state indication signals #STAT_EN, STAT_CK, and STAT_Q illustrated in FIG. 16.

Among the state indication signals #STAT_EN, STAT_CK, and STAT_Q illustrated in FIG. 16, the state indication signal STAT_Q is '0000'. For example, the state indication signal STAT_Q that is '0000' may be generated by latching the state indication signal #STAT_EN at a rising edge of the state indication signal STAT_CK. The state indication signal STAT_Q denotes the location of a memory chip that is being accessed. In FIG. 16, '0000' may correspond to the first memory chip. The module controller may receive the state indication signal STAT_Q that is '0000' and thus determine that the data read from the first memory chip is being prepared.

Among state indication signals #STAT_EN, STAT_CK, and STAT_Q illustrated in FIG. 17, the state indication signal STAT_Q is '0011'. For example, the state indication signal STAT_Q that is '0011' may be generated by latching the state indication signal #STAT_EN at a rising edge of the state indication signal STAT_CK. The state indication signal STAT_Q denotes the location of a memory chip that is being accessed. In FIG. 17, '0011' may correspond to a third memory chip among the sixteen memory chips connected to the crossbar switch CS. The module controller may receive the state indication signal STAT_Q that is '0011' and thus determine that data read from the third memory chip, which is requested by the module controller, is being prepared.

Figure 18:
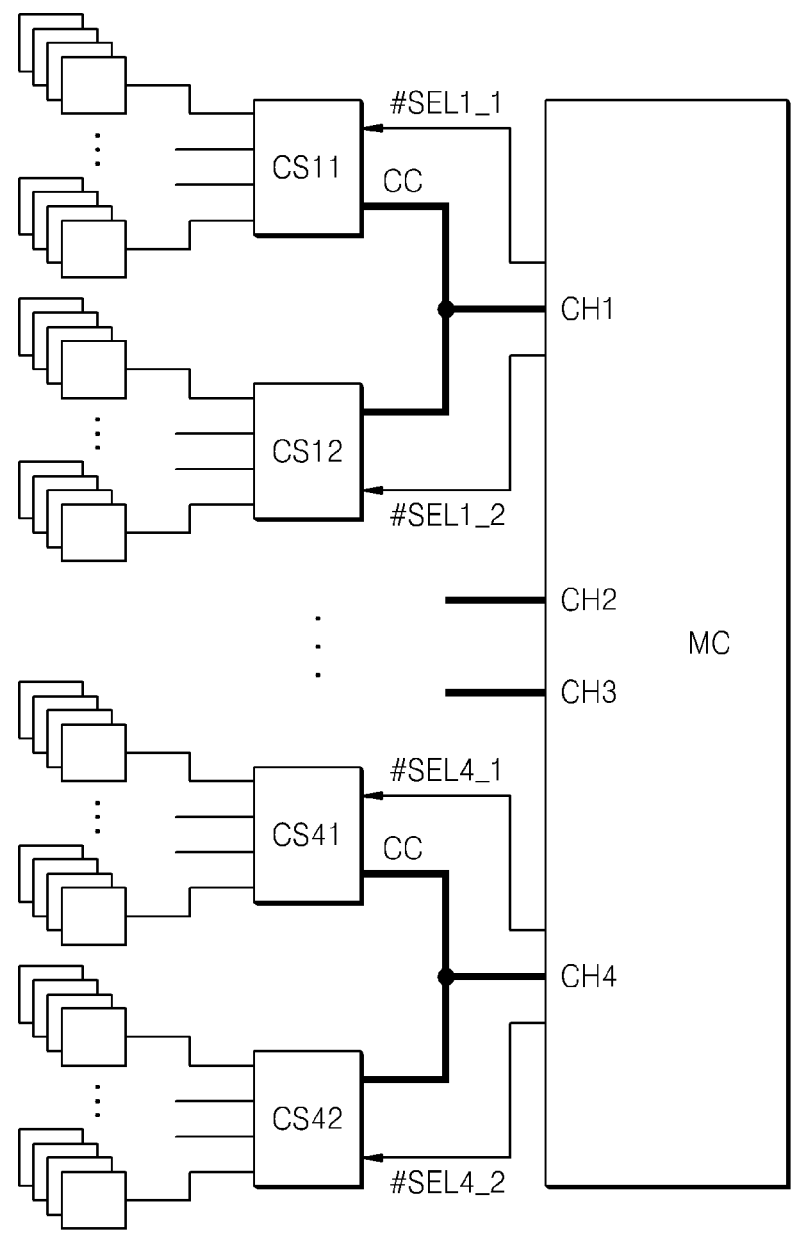
FIG. 18 is a schematic block diagram of a storage module according to at least one example embodiment.

FIG. 18 is a schematic block diagram of a storage module according to at least one example embodiment. The storage module of FIG. 18 may be a modified example of the SSS module of FIG. 12. A description of the storage module of FIG. 18 that is the same as the SSS module of FIG. 12 is not described again here.

Referring to FIG. 18, a module controller MC may be connected to a controller channel CCH provided to communicate with a crossbar switch. The controller channel CCH may be connected to a plurality of crossbar switches, e.g., crossbar switches CS11 and CS12. That is, the plurality of crossbar switches CS11 and CS12 may share the controller channel CCH.

The controller channel CCH may include crossbar switch selection signals #SEL1_1 and #SEL1_2 for selecting the plurality of crossbar switch CS1 and CS12 connected to one controller channel. The module controller MC may activate the plurality of crossbar switches CS11 and CS12 based on the crossbar switch selection signals #SEL1_1 and #SEL1_2.

Characteristics, such as shape and thickness, of elements shown in the drawings may be exaggerated for clarity and are not limited to those illustrated in the drawings. The same reference numerals represent the same elements throughout the drawings.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A memory system comprising:
 a plurality of separate solid state storage modules including at least a first solid state module and a second solid state module;
 a host controller; and
 a host interface bus, the host interface bus configured to connect the host controller to each of the plurality of solid state storage modules, the host controller being configured to control a data writing operation of the plurality of solid state storage modules such that the host controller sends first data to the first solid state storage module via the host interface bus, and the host controller sends second data to the second solid state storage module via the host interface bus such that the second data is received at the second solid state storage module while the first solid state storage module is writing the first data.

2. The memory system of claim 1, further comprising:
 a first connector configured to connect to the first solid state storage module; and
 a second connector configured, to connect to the second solid state storage module,
 wherein the host interface bus is configured to connect to the first solid state storage module and the second solid state storage module via the first connector and the second connector, respectively.

3. The memory system of claim 2, wherein the host controller is configured to control the host interface bus to divide write chunk data into the first and second data before sending the first and second data, respectively, to the first solid state storage module via the first connector and the second solid state storage module via the second connector.

4. The memory system of claim 1 wherein the memory system is configured such that, when the first data and the second data are equal in size,
 the host interface bus transfers the first data from the host controller to the first solid state storage module,
 the first solid state storage module writes the first portion received from host controller via the host interface bus,
 the host interface bus begins transfer of the second data from the host controller to the second solid state storage module after completing the transfer of the first data from the host controller to the first solid state storage module, and
 the host interface bus completes the transfer of the second portion from the host controller to the second solid state storage module before the first sold state storage module completes the writing of the first data.

5. A memory module comprising:
a first storage module including a first module controller and a first memory unit, the first storage module being configured to receive first partial data from a host and write the first partial data to the first memory unit;
a second storage module including a second module controller and a second memory unit, the second storage module being configured to receive second partial data from the host and write the second partial data to the second memory unit, wherein the first storage module and the second storage module are configured to connect to the host through a single host interface bus; and
the single host interface bus,
the memory module being configured such that, when the first partial data and the second partial data are equal in size,
  the single host interface bus transfers the first partial data from the host to the first memory unit,
  the first memory unit writes the first partial data received from host via the single host interface bus,
  the single host interface bus begins transfer of the second partial data from the host to the second memory unit after completing the transfer of the first partial data from the host to the first memory unit, and
  the single host interface bus completes the transfer of the second partial data from the host to the second memory unit before the first memory unit completes the writing of the first partial data.

6. A memory system comprising:
a first storage module;
a second storage module;
a first connector configured to connect to the first storage module;
a second connector configured to connect to the second storage module;
a host controller configured to connect to the first connector and the second connector through a single host interface bus; and
the single host interface bus,
wherein the host controller is configured to transmit chunk data to the first storage module and the second storage module through the single host interface bus,
the chunk data including a first portion being transmitted to the first storage module and a second portion being transmitted to the second storage module,
the memory system being configured such that, when the first portion and the second portion are equal in size,
  the single host interface bus transfers the first portion from the host controller to the first storage module,
  the first storage module writes the first portion received from host controller via the single host interface bus,
  the single host interface bus begins transfer of the second portion from the host controller to the second memory module after completing the transfer of the first portion from the host controller to the first memory module, and
  the single host interface bus completes the transfer of the second portion from the host controller to the second memory module before the first memory module completes the writing of the first portion.

* * * * *